US010922838B2

(12) United States Patent
Sakamoto

(10) Patent No.: US 10,922,838 B2
(45) Date of Patent: Feb. 16, 2021

(54) IMAGE DISPLAY SYSTEM, TERMINAL, METHOD, AND PROGRAM FOR DISPLAYING IMAGE ASSOCIATED WITH POSITION AND ORIENTATION

(71) Applicant: NEC CORPORATION, Tokyo (JP)

(72) Inventor: Shizuo Sakamoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 123 days.

(21) Appl. No.: 16/079,846

(22) PCT Filed: Feb. 23, 2017

(86) PCT No.: PCT/JP2017/006864
§ 371 (c)(1),
(2) Date: Aug. 24, 2018

(87) PCT Pub. No.: WO2017/146162
PCT Pub. Date: Aug. 31, 2017

(65) Prior Publication Data
US 2019/0073791 A1 Mar. 7, 2019

(30) Foreign Application Priority Data
Feb. 26, 2016 (JP) .............................. JP2016-035650

(51) Int. Cl.
*G06K 9/62* (2006.01)
*G06T 7/73* (2017.01)
(Continued)

(52) U.S. Cl.
CPC .............. *G06T 7/74* (2017.01); *G06F 16/587* (2019.01); *G06K 9/6211* (2013.01); *G06K 9/6215* (2013.01); *G06F 16/50* (2019.01)

(58) Field of Classification Search
CPC ..... G06F 16/50; G06F 16/587; G06K 9/6211; G06K 9/6215; G06T 7/74
See application file for complete search history.

(56) References Cited

U.S. PATENT DOCUMENTS 7,844,611 B2   11/2010  Miyajima et al.
7,979,428 B2    7/2011  Miyajima et al.
(Continued)

FOREIGN PATENT DOCUMENTS

EP      1 703 426 A1     9/2006
JP      2004-094397 A    3/2004
(Continued)

OTHER PUBLICATIONS

Communication dated Apr. 16, 2019 issued by the Japanese Patent Office in counterpart application No. 2018-501769.
(Continued)

*Primary Examiner* — Nirav G Patel
(74) *Attorney, Agent, or Firm* — Sughrue Mion, PLLC

(57) ABSTRACT

The present invention provides an image display system, a terminal, a method, and a program that can quickly and accurately display an image corresponding to a particular place. An image display system according to one example embodiment of the present invention includes: an information acquisition unit that acquires information including a position and an orientation of a mobile terminal; and an image acquisition unit that, based on the position and the orientation of the mobile terminal and a position and an orientation associated with an image stored in a storage device in the past, acquires the image.

12 Claims, 15 Drawing Sheets

(51) Int. Cl.
*G06F 16/587* (2019.01)
*G06F 16/50* (2019.01)

(56) References Cited

U.S. PATENT DOCUMENTS

| | | | |
|---|---|---|---|
| 8,880,535 B1 | 11/2014 | Agarwal et al. | |
| 9,476,970 B1* | 10/2016 | Fairfield | G05D 1/0268 |
| 9,635,234 B2 | 4/2017 | Nakamura et al. | |
| 2006/0041556 A1 | 2/2006 | Taniguchi et al. | |
| 2010/0191459 A1* | 7/2010 | Carter | H04N 1/00323 |
| | | | 701/532 |
| 2012/0114239 A1 | 5/2012 | Flynn et al. | |
| 2015/0161476 A1* | 6/2015 | Kurz | G06K 9/6202 |
| | | | 382/190 |
| 2015/0358525 A1* | 12/2015 | Lord | G06K 9/00993 |
| | | | 358/473 |
| 2017/0154426 A1* | 6/2017 | Cheng | G06K 9/6215 |

FOREIGN PATENT DOCUMENTS

| | | |
|---|---|---|
| JP | 2009-020091 A | 1/2009 |
| JP | 2009-187233 A | 8/2009 |
| JP | 2011-10171 A | 1/2011 |
| JP | 2012-044251 A | 3/2012 |
| WO | 2013/118460 A2 | 8/2013 |

OTHER PUBLICATIONS

Extended European Search Report dated Aug. 8, 2019 issued by the European Patent Office in counterpart application No. 17756600.7.
"Quasi-Zenith Satellite System Navigation Service", Interface Specification for QZSS, Japan Aerospace Exploration Agency, Nov. 28, 2014, IS-QZSS Ver. 1.6, Internet <URL: http://qz-vision.jaxa.ip/USE/is-gzss/DOCS/IS-QZSS_16_J.pdf>, 248 pages.
International Search Report for PCT/JP2017/006864 dated May 16, 2017 [PCT/ISA/210].

\* cited by examiner

IMAGE DISPLAY SYSTEM, TERMINAL, METHOD, AND PROGRAM FOR DISPLAYING IMAGE ASSOCIATED WITH POSITION AND ORIENTATION

CROSS REFERENCE TO RELATED APPLICATIONS

This application is a National Stage of International Application No. PCT/JP2017/006864, filed on Feb. 23, 2017, which claims priority from Japanese Patent Application No. 2016-035650, filed on Feb. 26, 2016, the disclosure of which is incorporated herein by reference in its entirety.

TECHNICAL FIELD

The present invention relates to an image display system, a terminal, a method, and a program that display an image captured in the past at a particular location.

BACKGROUND ART

In security of an area, detection of a suspicious object is performed. A suspicious object may be an explosive or a toxic substance, for example, which is basically an object which is not usually placed at the place. Thus, detection of a suspicious object requires determination as to whether or not the object is usually placed.

In particular, in security of an important event, surveys are performed over multiple times, and the personnel may be different for each survey. For example, in security of an important person, personnel who perform a survey in advance on a planned route and personnel who perform safety check immediately before the important person passes by are often different in actual practice. It is difficult to report all, to the personnel who perform check immediately before an important person passes by, whether or not it is an object that has been confirmed to be usually placed. Thus, when a suspicious object has been placed after the previous survey, the personnel who check immediately before the important person passes by may not notice the suspicious object or may overreact to the object and take time for check even though it is not a suspicious object.

For example, it may be possible to capture and accumulate various places as images in advance in a prior survey, compare the images with the current landscape in the prior survey, and thereby examine whether or not an object which was not present in the prior survey increases in the current landscape. In this case, such a technology is required that stores and provides many images captured in the prior survey in association with capturing places.

In the art disclosed in Patent Literature 1, images associated with position information indicating capturing places are accumulated on a server, and the server selects an image close to the current position or a position designated by a user out of the accumulated images to display the image on a display of a mobile terminal.

CITATION LIST

Patent Literature

PTL 1: Japanese Patent Application Publication No. 2009-187233

Non Patent Literature

NPL 1: "Quasi-Zenith Satellites System User Interface Specification," [online], Nov. 28, 2014, Japan Aerospace Exploration Agency, [searched on Feb. 25, 2016], Internet <URL: http://qz-vision.jaxa.jp/USE/is-qzss/DOCS/IS-QZSS_16_J.pdf>, p. A1-A12

SUMMARY OF INVENTION

Technical Problem

Since the art disclosed in Patent Literature 1 only displays an image captured at a position close to the current position or a designated position, however, it is not to display an image in which a particular place (landscape) is captured. That is, an image acquired based only on a position may include a plurality of images in which all the directions are captured from the position. It takes much time to search many images acquired based only on a position for an image in which a particular place is captured. In security performed in a wide range, since it is demanded to reduce time taken at one place, it is difficult to use the art disclosed in Patent Literature 1 for security including detection of a suspicious object.

The present invention has been made in view of the above problem and intends to provide an image display system, a terminal, a method, and a program that can quickly and accurately display an image corresponding to a particular place.

Solution to Problem

The first example aspect of the present invention is an image display system including: an information acquisition unit that acquires information including a position and an orientation of a mobile terminal; and an image acquisition unit that, based on the position and the orientation of the mobile terminal and a position and an orientation associated with an image stored in a storage device in the past, acquires the image.

The second example aspect of the present invention is a terminal including: an information acquisition unit that acquires information including a position and an orientation; and an image display unit that, based on the position and the orientation and a position and an orientation associated with an image stored in a storage device in the past, displays the image.

The third example aspect of the present invention is a method including: acquiring information including a position and an orientation of a mobile terminal; and based on the position and the orientation of the mobile terminal and a position and an orientation associated with an image stored in a storage device in the past, acquiring the image.

The fourth example aspect of the present invention is a program that causes a computer to perform: acquiring information including a position and an orientation of a mobile terminal; and based on the position and the orientation of the mobile terminal and a position and an orientation associated with an image stored in a storage device in the past, acquiring the image.

Advantageous Effects of Invention

According to the present invention, since an image stored in the past is acquired based on the position and the orientation of a mobile terminal, it is possible to easily acquire and display an image corresponding to a particular place which the user having the mobile terminal faces.

DESCRIPTION OF EMBODIMENTS

Figure 1:
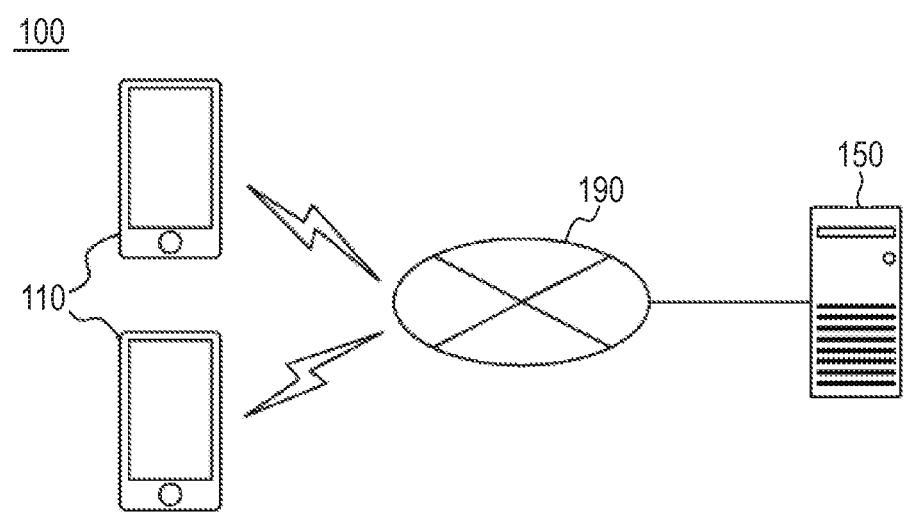
FIG. 1 is a schematic diagram of an image display system according to a first example embodiment.

While example embodiments of the present invention will be described below with reference to the drawings, the present invention is not limited to the present example embodiments. Note that, in the drawings described below, components having the same function are labeled with the same references, and the duplicated description thereof may be omitted.

First Example Embodiment

FIG. 1 is a schematic diagram of an image display system 100 according to the present example embodiment. The image display system 100 has a mobile terminal 110 and a server 150. The mobile terminal 110 and the server 150 are connected to each other via wired connection or wireless connection via a network 190 such as the Internet. The image display system 100 may include devices such as another server, another mobile terminal, or the like. The mobile terminal 110 is a terminal that is carried by a customer and has an image capture function using a camera and a function of displaying an image acquired from the server 150. The server 150 is a server that is installed at any location and performs storage and acquisition of an image.

Figure 2:
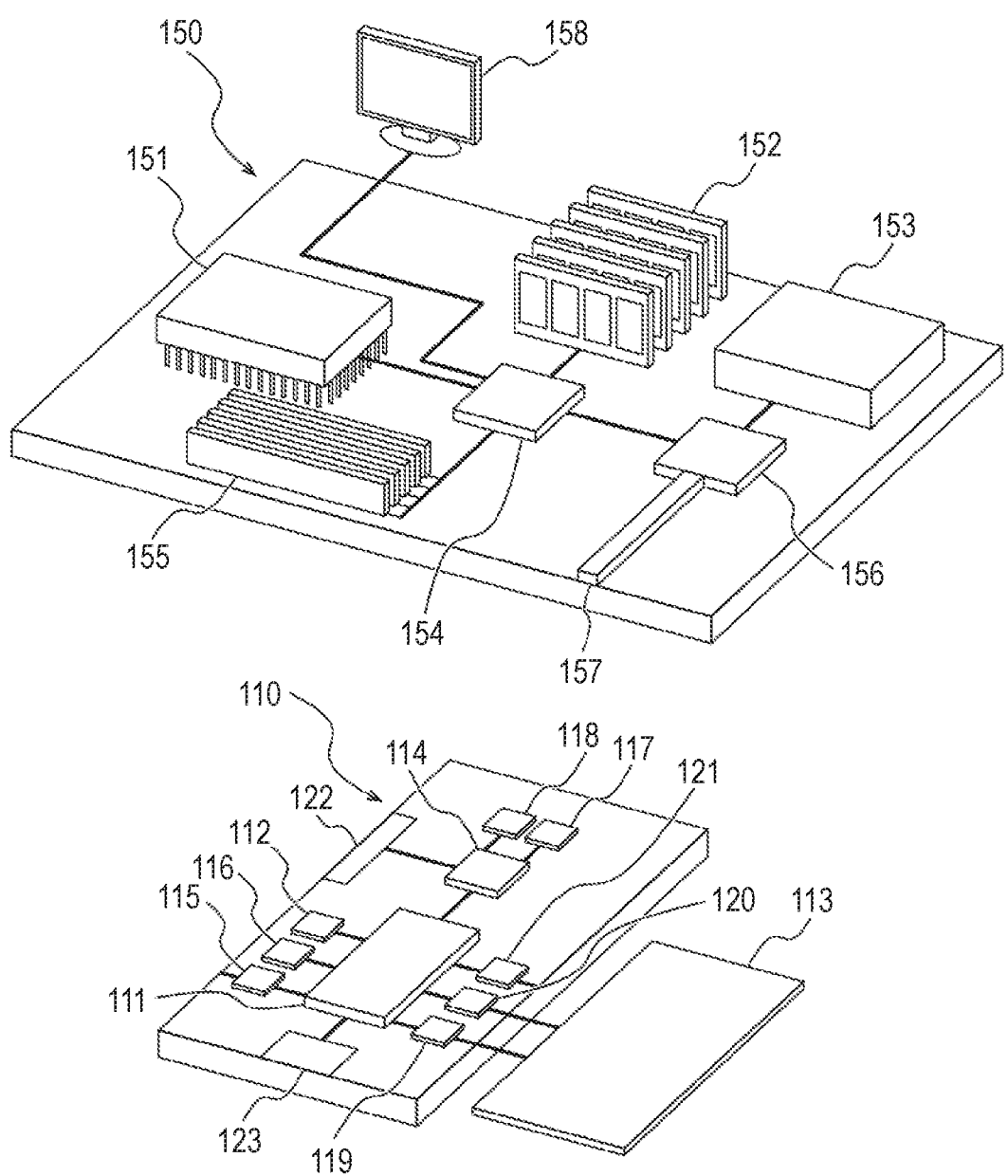
FIG. 2 is a general configuration diagram of a mobile terminal and a server according to the first example embodiment.

FIG. 2 is a general configuration diagram of the mobile terminal 110 and the server 150 according to the present example embodiment. Note that each of the mobile terminal 110 and the server 150 may be formed of a single device, or may be formed of two or more physically separated devices in wired connection or wireless connection. For example, the server 150 is a laptop computer, a desktop computer, a workstation, a personal digital assistant, a server, a blade server, a mainframe, an embedded system, or the like. For example, the mobile terminal 110 is a personal digital assistant, a mobile phone, a smartphone, or the like. The specific hardware configuration of the mobile terminal 110 and the server 150 is not limited to the following configuration, and may be of various types or forms.

The server 150 has a processor 151, memory 152, and a storage device 153. Further, the server 150 has a high-speed controller 154 including a high-speed interface and a low-speed controller 156 including a low-speed interface. The memory 152 and a high-speed expansion port 155 are connected to the high-speed controller 154. Further, a display device such as a display 158 or the like is connected to the high-speed controller 154. On the other hand, a low-speed expansion port 157 and a storage device 153 are connected to the low-speed controller 156.

The processor 151, the memory 152, the storage device 153, and the high-speed controller 154, the low-speed controller 156, and the high-speed expansion port 155 are connected to each other through various buses. Further, the processor 151, the memory 152, the storage device 153, the high-speed controller 154, the low-speed controller 156, and the high-speed expansion port 155 may be implemented on a common motherboard or may be implemented in other forms as appropriate.

The processor 151 is a central processing unit (CPU), for example, and is able to process instructions executed within the server 150. Such instructions include an instruction that is used for displaying graphics information of a graphical user interface (GUI) on a display device such as the display 158 and stored in the memory 152 or the storage device 153.

Further, a plurality of processors, a plurality of busses, or a plurality of processors and a plurality of busses can be used as appropriate together with a plurality of memory devices and multiple types of memory devices. Further, a plurality of servers 150 can be connected to each device that performs a part of the necessary process. For example, a plurality of servers 150 can be connected to each other as a server bank, a group of blade servers, or a multiprocessor system.

The memory 152 stores therein information within the server 150. For example, the memory 152 may be a volatile memory unit or a non-volatile memory unit. The memory 152 may be another computer readable storage medium, such as a magnetic disk, an optical disk, or the like, for example.

The storage device 153 can configure mass storage used for the server 150. The storage device 153 may be, for example, a computer readable storage medium such as a floppy (registered trademark) disk device, a hard disk device, an optical disk device, a tape device, a solid state memory device such as a flash memory, a disk array, or the like or may include such a computer readable storage medium. The storage device 153 may be a storage area network or a device with another configuration.

The high-speed controller 154 manages processes in which the bandwidth for the server 150 is intensively used. On the other hand, the low-speed controller 156 manages processes in which the bandwidth is less intensively used. However, such allocation of the functions is a mere example, and allocation is not limited thereto. Further, a part or a whole of the high-speed controller 154 may be incorporated in the processor 151.

The high-speed controller 154 is connected to the high-speed expansion port 155 that can accept the memory 152 and various expansion cards. Further, the high-speed controller 154 is connected to the display 158 via a graphics processor or an accelerator, for example.

The low-speed controller 156 is connected to the storage device 153 and the low-speed expansion port 157. The low-speed expansion port 157 can include, for example, a communication port of various standards such as Universal Serial Bus (USB), Bluetooth (registered trademark), wired or wireless Ethernet (registered trademark), or the like. One or plurality of input/output devices such as a keyboard, a pointing device, a scanner, or the like can be connected to the low-speed expansion port 157. Further, one or plurality of network devices such as a switch, a router, or the like can be connected to the low-speed expansion port 157 via a network adapter, for example. That is, the low-speed expansion port 157 functions as a communication interface.

The server 150 can be implemented in many forms without being limited to the forms described above. For example, the server 150 can be implemented in a form of a typical server or a plurality of servers in a form of a group of such servers. Further, the server 150 can be implemented as a part of the rack server system. Furthermore, the server 150 can be implemented in a form of a personal computer such as a laptop computer, a desktop computer, or the like.

Note that a part or a whole of the program executed by the processor 151 of the server 150 can be provided by a computer readable storage medium storing the above, such as a digital versatile disc-read only memory (DVD-ROM), a compact disc-read only memory (CD-ROM), a USB memory, or a flash memory.

The mobile terminal 110 has a processor 111, memory 112, a display 113, a communication interface 114, a camera 115, and an electronic compass 116. The mobile terminal 110 may have a storage device such as a micro drive, a flash memory, or the like as additional storage. Respective components of the mobile terminal 110 are connected to each other using various busses. At least some of the components of the mobile terminal 110 may be attached on a common motherboard or may be attached by other ways.

The processor 111 can execute instructions residing in the mobile terminal 110 including instructions stored in the memory 112. The processor 111 may be implemented as a chip or a chipset having one or a plurality of analog or digital processors. The processor 111 controls other components of the mobile terminal 110 and performs display of a user interface, execution of an application, wireless communication, or the like, for example.

The processor 111 can perform input/output of information to a user through a display interface 119 and an input interface 120 connected to the display 113. As a display 113, any display unit such as a liquid crystal display, an organic electro luminescence (EL) display, or the like may be used, for example. The display interface 119 has a circuit necessary for driving the display 113 so as to present an image and other information to the user. Further, the display 113 is configured as a touch panel and outputs a user operation as an electric signal. The input interface 120 accepts an electric signal indicating a user operation on the display 113 and converts it for transmission to the processor 111.

The memory 112 stores therein information within the mobile terminal 110. The memory 112 is a computer readable storage medium, a volatile memory unit, a non-volatile memory unit, or a combination thereof, for example. As the memory 112, a flash memory, a non-volatile random access memory (NVRAM), or the like may be used, for example.

The camera 115 is an image capturing unit that outputs a resulted captured image as digital data. As the camera 115, any image capturing device such as a charge coupled device (CCD) camera, a complementary metal oxide semiconductor (CMOS) camera, or the like may be used. The camera 115 includes an image capturing element, an electric circuit, a lens, and the like necessary for image capturing.

The electronic compass 116 is an orientation acquisition unit that acquires the orientation of the mobile terminal 110. As the electronic compass 116, any device such as a terrestrial magnetism that is capable of acquiring the orientation of the mobile terminal 110 may be used.

The communication interface 114 is connected to a Global Positioning System (GPS) receiver 117 and a mobile communication device 118. The mobile communication device 118 performs mobile communication using any mode or protocol including a voice communication with Global System for Mobile communication (GSM) scheme or the like, messaging such as Short Message Service (SMS), and data communication with Code Division Multiple Access (CDMA) scheme or the like. The mobile communication device 118 includes a processor, an electric circuit, an antenna, and the like necessary for mobile communication.

The GPS receiver 117 is a position acquisition unit that acquires the position of the mobile terminal 110. The GPS receiver 117 includes a processor, an electric circuit, an antenna, and the like necessary for receiving the position of the mobile terminal 110 from the GPS. While the coordinates (x-coordinate and y-coordinate with a predetermined location being the origin) in the horizontal direction in a plan map display are used as a position for simplicity in the present example embodiment, any positional expression such as a latitude and a longitude may be used instead thereof. Furthermore, a height may be used as a position in addition to the coordinates in the horizontal direction. A height (altitude) can be calculated based on a GPS signal. This allows for distinction of a position in the height direction (for example, a level within a building), which makes it possible to acquire an image that is different for respective heights in addition to the horizontal direction coordinates in the image display method described below.

Since a position is calculated based on a signal from a satellite in the GPS, the position may not be acquired inside a building. Thus, a positioning technology utilizing Indoor MEssaging System (IMES) (Non Patent Literature 1), a wireless Local Area Network (LAN), or the like that acquires a position by receiving a signal of position information transmitted from a transmitter provided on the land may be used instead of or in addition to the GPS.

The mobile terminal 110 can perform communication by voice using an audio interface 121. The audio interface 121 is connected to a microphone and a speaker. The audio interface 121 accepts speech information from the user through the microphone and converts it into digital information which can be processed by the processor 111. Further, the audio interface 121 can generates an audible sound to the user through the speaker, for example. A sound output by the audio interface 121 includes a voice from a voice call, a sound recorded in the memory 112 (for example, a voice message, a music file, or the like), or a sound generated by an application running on the mobile terminal 110.

The mobile terminal 110 is provided with an expansion interface 122 and an external interface 123. The expansion interface 122 is connected to expansion memory, for example. The expansion memory functions as additional storage to the mobile terminal 110 and may store a program running on the mobile terminal 110 or other information. Further, the expansion memory may store secure information, and, in this case, functions as a security module.

The external interface 123 is configured to communicate with the processor 111 and can perform wired communication or wireless communication. For example, the external interface 123 performs near field communication such as Bluetooth (registered trademark) or wireless communication such as wireless LAN between the mobile terminal 110 and other devices. As the external interface 123, a plurality of interfaces may be combined and used.

Figure 3:
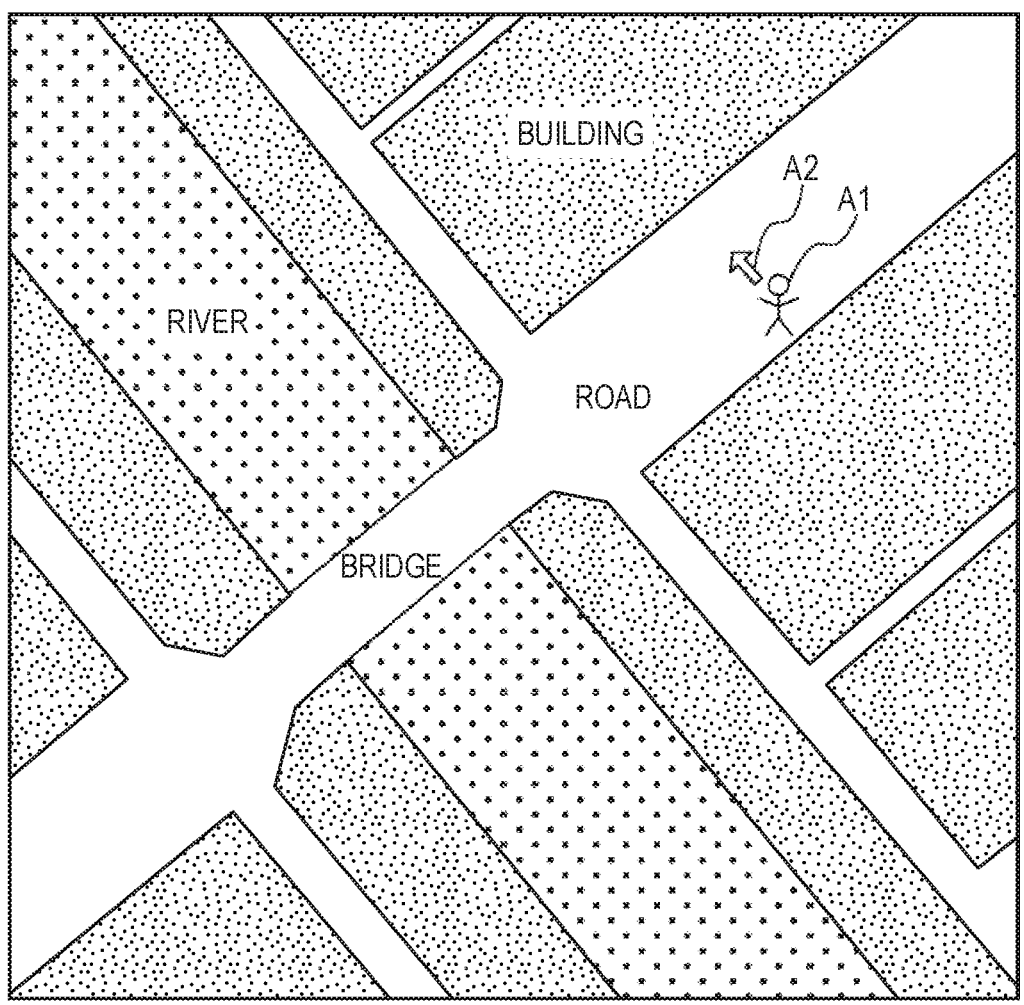
FIG. 3 is a schematic diagram illustrating a position of a user having the mobile terminal according to the first example embodiment.

FIG. 3 is a schematic diagram illustrating the position of a user having the mobile terminal 110. The user directs the camera 115 of the mobile terminal 110 to a particular orientation A2 at a position A1. In this state, the mobile terminal 110 sequentially displays the image captured by the camera 115 (referred to as a current image) on the display 113. Since the user usually holds the camera 115 in front thereof to capture an image, an image captured range of the current image corresponds to a current field of view of the user having the mobile terminal 110. In the following, the position and the orientation of the mobile terminal 110 in a state where the user holds the camera 115 in front thereof are referred to as a current position and a current orientation of the mobile terminal 110. Further, in response to the user performing a predetermined operation with the mobile terminal 110, the mobile terminal 110 displays an image including a place captured in the past which is similar to the current image (referred to as a past image) on the display 113.

Figure 4:
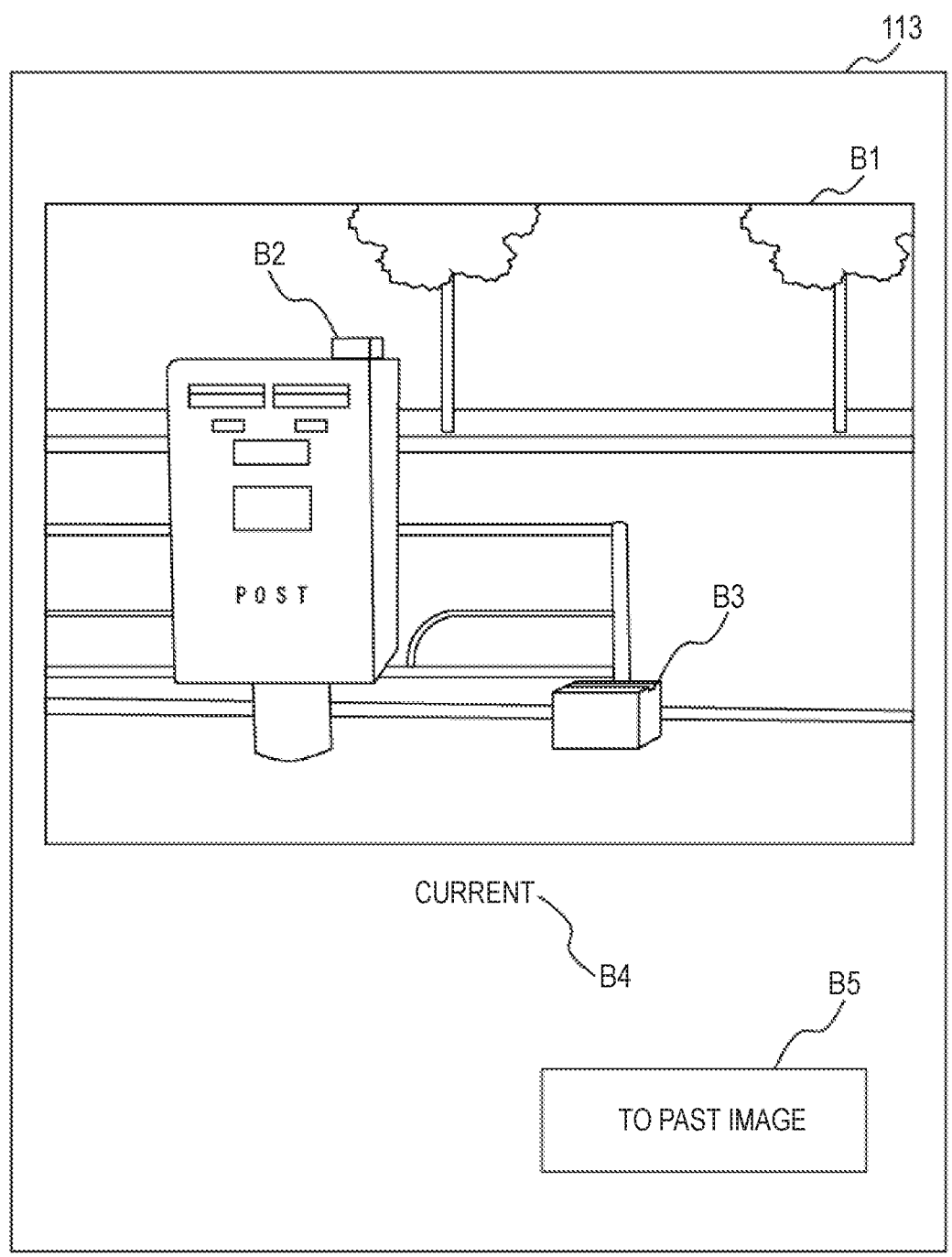
FIG. 4 is a front view of a display of the mobile terminal displaying a current image.

FIG. 4 is a front view of the display 113 of the mobile terminal 110 displaying a current image B1. Upon startup of an image display program according to the present example embodiment, the mobile terminal 110 enters a state of displaying the current image on the display 113 as illustrated in FIG. 4. The display 113 displays the current image B1, a text B4 indicating that it is the current image, and a button B5 used for displaying the past image.

The current image B1 is updated to an image captured by the camera 115 every predetermined time (for example, every 1/30 seconds). For example, an object B2 and an object B3 are included in the current image B1.

The button B5 is a virtual button displayed on the display 113 and can be pressed by the user operating a touch panel or the like. In response to the button B5 being pressed by the user, the mobile terminal 110 transfers to a state where the past image is displayed on the display 113 as illustrated in FIG. 5.

Figure 5:
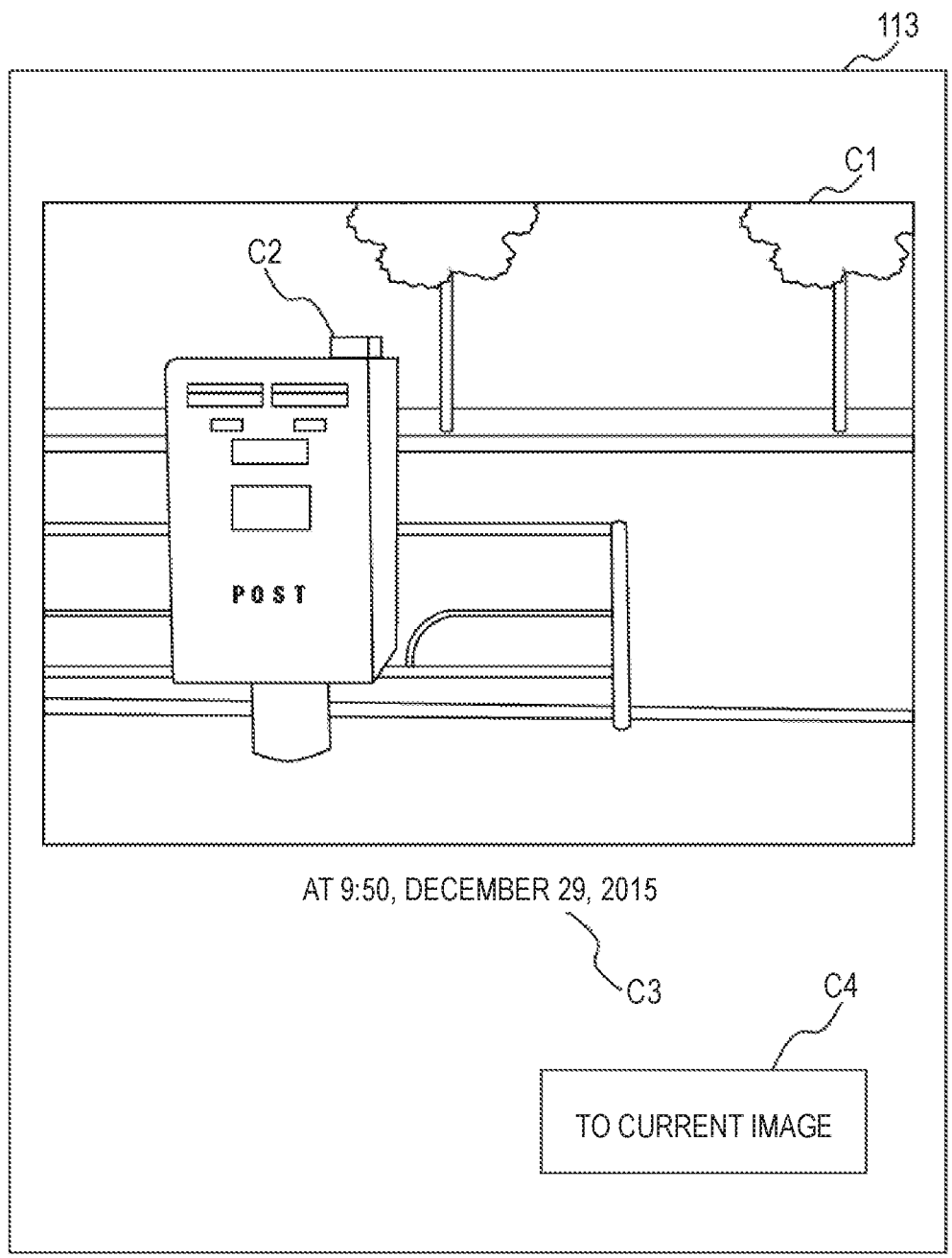
FIG. 5 is a front view of a display of the mobile terminal displaying a past image.

FIG. 5 is a front view of the display 113 of the mobile terminal 110 displaying a past image C1. The display 113 displays the past image C1, a text C3 indicating the captured time of the past image C1, and a button C4 used for displaying the current image.

The past image C1 is an image which is received from the server 150 and includes a place captured in the past which is similar to the current image B1. A selection method of the past image C1 will be described later. While an image of the object C2 corresponding to the object B2 within the current image B1 is included within the past image C1, no image of an object corresponding to the object B3 is included. Because the object B3 within the current image B1 is newly placed, the user can determine that it is likely to be a suspicious object by visually comparing the current image B1 with the past image C1.

The button C4 is a virtual button displayed on the display 113 and can be pressed by the user operating a touch panel or the like. In response to the button C4 being pressed by the user, the mobile terminal 110 transfers to a state where the current image is displayed on the display 113 as illustrated in FIG. 4.

Figure 6:
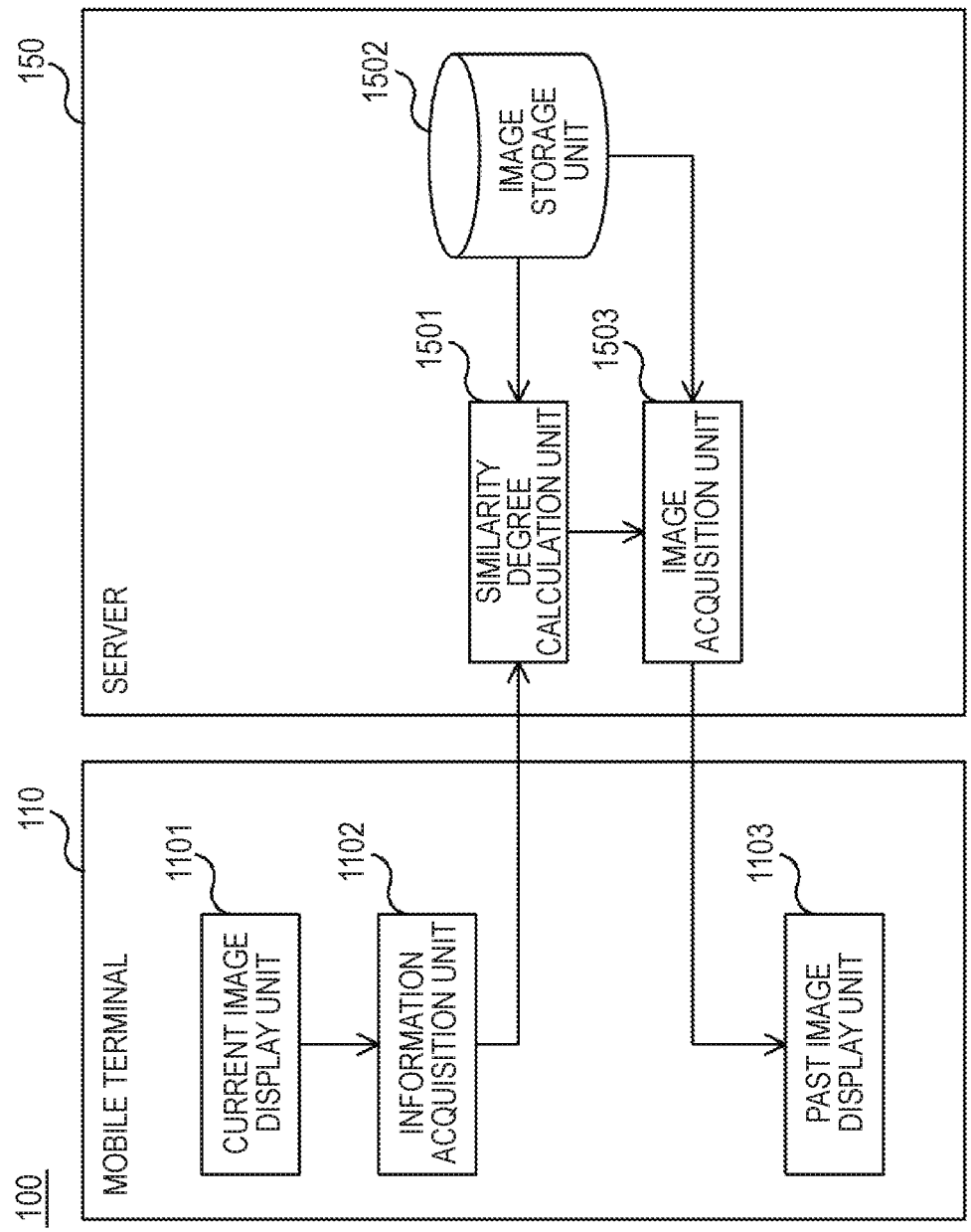
FIG. 6 is a block diagram of an image display system according to the first example embodiment.

FIG. 6 is a block diagram of the image display system 100 according to the present example embodiment. In FIG. 6, arrows represent main dataflows, and there may be other dataflows than those illustrated in FIG. 6. In FIG. 6, each block illustrates a configuration in a unit of function rather than in a unit of hardware (device).

The mobile terminal 110 has a current image display unit 1101, an information acquisition unit 1102, and a past image display unit 1103. In the mobile terminal 110, the current image display unit 1101, the information acquisition unit 1102, and the past image display unit 1103 are stored in the memory 112 as programs that can be executed by the processor 111, respectively. That is, in execution of the image display method according to the present example embodiment, the processor 111 functions as the current image display unit 1101, the information acquisition unit 1102, and the past image display unit 1103. At least a part of these functions may be implemented as an electric circuit instead of a program.

The server 150 has a similarity degree calculation unit 1501, an image storage unit 1502, and an image acquisition unit 1503. In the server 150, the similarity degree calculation unit 1501 and the image acquisition unit 1503 are stored in the memory 152 or the storage device 153 as programs that can be executed by the processor 151. Further, the image storage unit 1502 is a part of the memory 152 or the storage device 153. That is, in execution of the image display method according to the present example embodiment, the processor 151 functions as the similarity degree calculation unit 1501 and the image acquisition unit 1503, and the memory 152 or the storage device 153 functions as the image storage unit 1502. At least a part of these functions may be implemented as an electric circuit instead of a program.

The current image display unit 1101 displays content currently captured by the camera 115 as the current image on the display 113. The current image display unit 1101 updates the current image being displayed every predetermined time (for example, every 1/30 seconds).

The information acquisition unit 1102 acquires the current position of the mobile terminal 110 by using the GPS receiver 117 in response to detection of a predetermined user operation (for example, pressing of the button B5 of FIG. 4). In the present example embodiment, for simplicity, the coordinates in the horizontal direction in a plan map display (x-coordinate and y-coordinate about a predetermined location as the origin) are used as a position. Alternatively, any positional expression such as a latitude and a longitude may be used as a position. Furthermore, a height may be used as a position in addition to the coordinates in the horizontal direction. At the same time, the information acquisition unit 1102 acquires the current orientation of the mobile terminal 110 by using the electronic compass 116. An orientation is a direction in which the camera 115 captures an image. In the present example embodiment, for simplicity, an angle in the direction horizontal to the ground (azimuth angle) is used as an orientation. In addition to an azimuth angle, an angle of the direction perpendicular to the ground (elevation/depression angle) may be used as an orientation. Then, the information acquisition unit 1102 uses the mobile communication device 118 to transmit information including the acquired current position and orientation to the server 150.

The image storage unit 1502 pre-stores past images and the positions and the orientations of the captured ranges of the past images. In the following, a position and an orientation of a captured range of a past image are simply referred to as a potion and an orientation of a past image. The image storage unit 1502 stores past images as image files that are electronic data. Each past image is provided with a unique identifier (for example, a file name). The image storage unit 1502 stores the positions and the orientations of the past images as a table of a database, for example, in association with the identifiers of the past images.

The similarity degree calculation unit 1501 uses the current position and orientation received from the mobile terminal 110 and the position and orientation associated with past images pre-stored in the image storage unit 1502 to calculates a similarity degree indicating the resemblance between them based on a predetermined calculation criterion.

A calculation method of a similarity degree performed by the similarity degree calculation unit 1501 will be described below. The similarity degree calculation unit 1501 calculates a similarity degree S by using Equation (1) for respective past images pre-stored in the image storage unit 1502.

[Math. 1]

$$S=\alpha(P0-P)^2+(Q0-Q)^2 \qquad (1)$$

The value P0 denotes the current orientation, and the value P denotes the orientation of a past image. The value Q0 denotes the current position, and the value Q denotes the position of the past image. The value α is a weighting factor used for adjusting weighting of the orientation and the position. Since the orientation is expressed by an azimuth angle in the present example embodiment, the values P0 and P each are an angle. Since the position is expressed by x-y coordinates in the present example embodiment, the values Q0 and Q are two-dimensional coordinates, respectively, and the item $(Q0-Q)^2$ means the square of the distance between the current position and the position of the past image.

According to Equation (1), the closer the position and orientation of a target past image to the current position and orientation of the mobile terminal 110 is, the lower the similarity degree S is. That is, the similarity degree S is an index indicating the resemblance of the position and orientation between the target past image and the mobile terminal. The definition of the similarity degree S described here is an example, and any definition that represents the resemblance between the current position and orientation and the position and orientation of a past image may be used. While a lower similarity degree S corresponds to higher resemblance in Equation (1), the similarity degree S may be defined in the opposite manner.

The similarity degree calculation unit 1501 may calculate the similarity degree S for all the past images stored in the image storage unit 1502 or may calculate the similarity degree S for some past images which satisfy a condition. For example, the amount of calculation can be reduced with only the past images having a position which has a distance to the current position of the mobile terminal 110 below a predetermined value being a calculation target.

The image acquisition unit 1503 acquires one past image having the smallest similarity degree S (that is, having the highest resemblance) or a particular number of past images in ascending order of the similarity degree S (that is, in descending order of the resemblance), out of the past images whose similarity degrees S have been calculated, from the image storage unit 1502. The image acquisition unit 1503 then uses the communication interface to transmit the acquired past image to the mobile terminal 110.

The past image display unit 1103 displays the past image received from the server 150 on the display 113. When a plurality of past images are received from the server 150, the past image display unit 1103 may display one of the past images (for example, having the smallest similarity degree S) and switch it to another past image for display in response to a user operation. Further, the past image display unit 1103 may display one of the plurality of past images (for example, having the smallest similarity degree S) as a larger image and display the rest as smaller images.

Not only a past image stored on a position and orientation basis but also a panoramic image captured for a wider angle range may be used as a past image stored in the image storage unit 1502. A panoramic image includes an image captured with an angle range wider than a captured range of the common camera 115 at a single position or an image captured with the entire range of 360 degrees. The panoramic image is created by combining a plurality of images captured in different orientations at the same position, for example. When a panoramic image close to the current position of the mobile terminal 110 is present, the similarity degree calculation unit 1501 may select, as a past image, a part cut out from the panoramic image in a direction corresponding to the current orientation of the mobile terminal 110. Further, the similarity degree calculation unit 1501 may select a whole panoramic image as a past image. In this case, the past image display unit 1103 may display a portion in a direction corresponding to the current orientation of the mobile terminal 110 out of the received panoramic image.

By selecting a past image using not only a position but also an orientation in such a way, the mobile terminal 110 can easily display a past image corresponding to the current captured range of the camera 115 (that is, the user's field of view).

Figure 7:
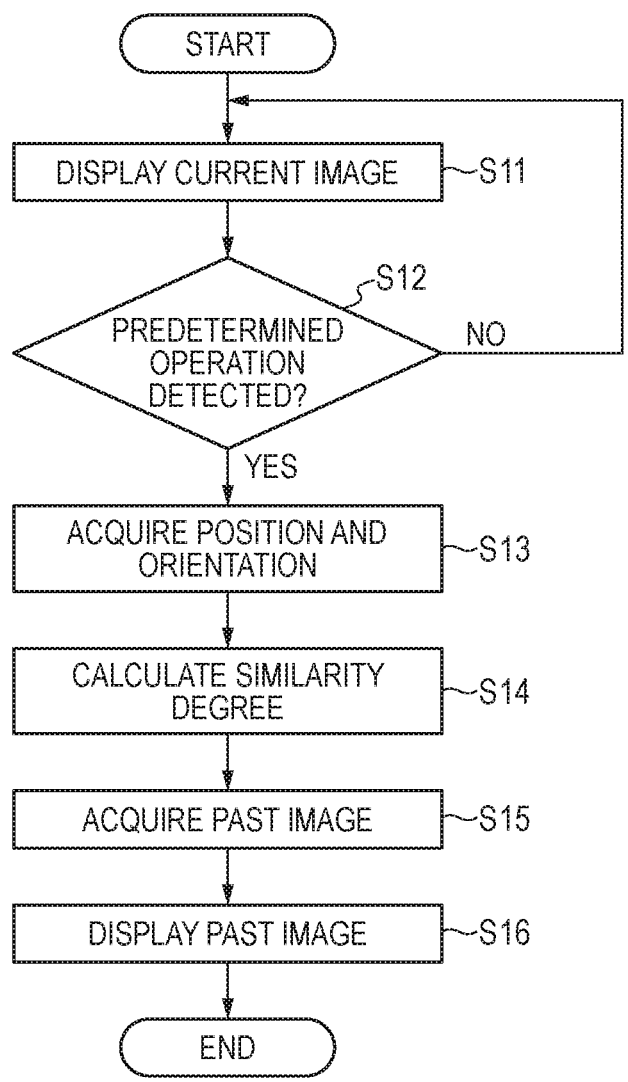
FIG. 7 is a diagram illustrating a flowchart of an image display method according to the first example embodiment.
Figure 8:
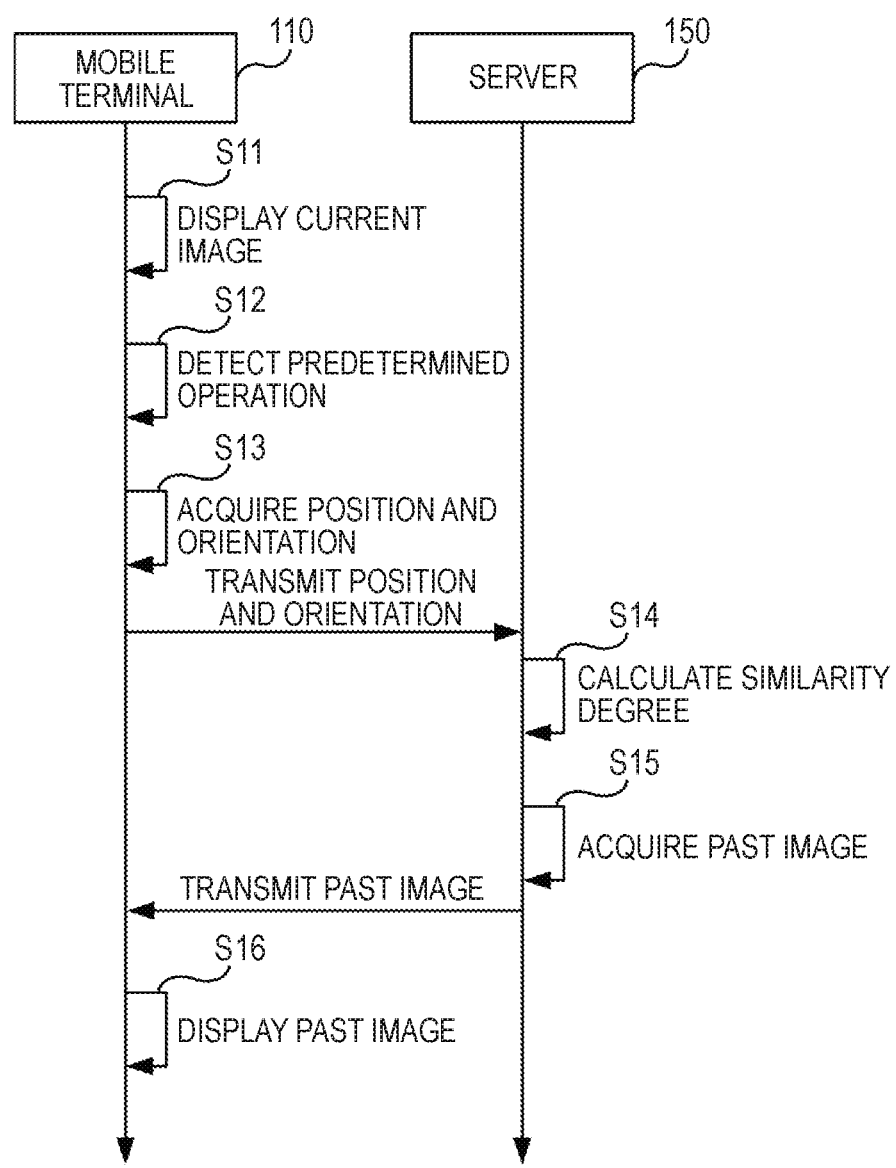
FIG. 8 is a diagram illustrating a sequence of the image display method according to the first example embodiment.

FIG. 7 is a diagram illustrating a flowchart of an image display method according to the present example embodiment. FIG. 8 is a sequence diagram of the image display method according to the present example embodiment. The image display method is performed in corporation with the mobile terminal 110 and the server 150. The image display method is started when a predetermined operation such as pressing of a button for displaying the current image is detected on the mobile terminal 110, for example.

First, the current image display unit 1101 displays the content currently captured by the camera 115 as a current image on the display 113 (step S11). If a predetermined operation such as pressing of a button for displaying a past image is not detected on the mobile terminal 110 (step S12, NO), the mobile terminal 110 repeats step S11 every predetermined time.

If a predetermined operation for displaying a past image is detected on the mobile terminal 110 (step S12, YES), the information acquisition unit 1102 acquires the current position of the mobile terminal 110 by using the GPS receiver 117 and acquires the current orientation of the mobile terminal 110 by using the electronic compass 116 (step S13). The information acquisition unit 1102 uses the mobile communication device 118 to transmit information including the acquired current position and orientation to the server 150.

The similarity degree calculation unit 1501 uses the current position and orientation received from the mobile terminal 110 to calculate the similarity degree S to each past image pre-stored in the image storage unit 1502 based on Equation (1) described above, for example (step S14).

The image acquisition unit 1503 acquires one past image having the smallest similarity degree S or a predetermined number of past images in ascending order of the similarity degree S, out of the past images whose similarity degrees S have been calculated in step S14, from the image storage unit 1502 (step S15). The image acquisition unit 1503 uses the communication interface to transmit the acquired past image to the mobile terminal 110.

The past image display unit 1103 displays one or a plurality of past images received from the server 150 on the display 113 (step S16).

The processor 111 of the mobile terminal 110 and the processor 151 of the server 150 are subjects of each step (process) included in the image display method illustrated in FIG. 7. That is, the processor 111 and the processor 151 read the program for executing the image display method illustrated in FIG. 7 from the memory 112, the memory 152, or the storage device 153, execute the program to control respective units of the mobile terminal 110 and the server 150, and thereby perform the image display method illustrated in FIG. 7.

According to the image display system 100 of the present example embodiment, the mobile terminal 110 can easily display a past image captured with a place similar to a current captured range of the camera 115 by only directing the camera 115. If an image is acquired by using only the position as seen in the technology disclosed in Patent Literature 1, since images captured in different directions from the same location cannot be distinguished, it is not possible to select an image corresponding to the current user's field of view. In contrast, the image display system 100 according to the present example embodiment acquires a past image by calculating a similarity degree using not only the position but also the orientation of the mobile terminal 110 and thus can display a past image corresponding to the current captured range of the camera 115, that is, the user's field of view.

When the image display system 100 according to the present example embodiment is used for security, it is possible to quickly and accurately acquire a past image corresponding to the user's current field of view and easily detect a suspicious object by comparing the current state with the past state.

The image display system 100 according to the present example embodiment can be applied to tourism application without being limited to security. It is possible to provide past images of different seasons or different time for the same landscape to the user by pre-storing images of different seasons, years, and months associated with the landscape as past images. Further, it is possible to provide to the user a picture in which the landscape is drawn by pre-storing a picture (landscape painting) associated with the landscape as a past image. In this case, the position and orientation of the drawing range of a picture can be used as the position and orientation associated with the past image. As discussed above, the image display system 100 can easily and accurately display an image associated with a particular place, that is, a particular position and orientation.

Second Example Embodiment

Figure 9:
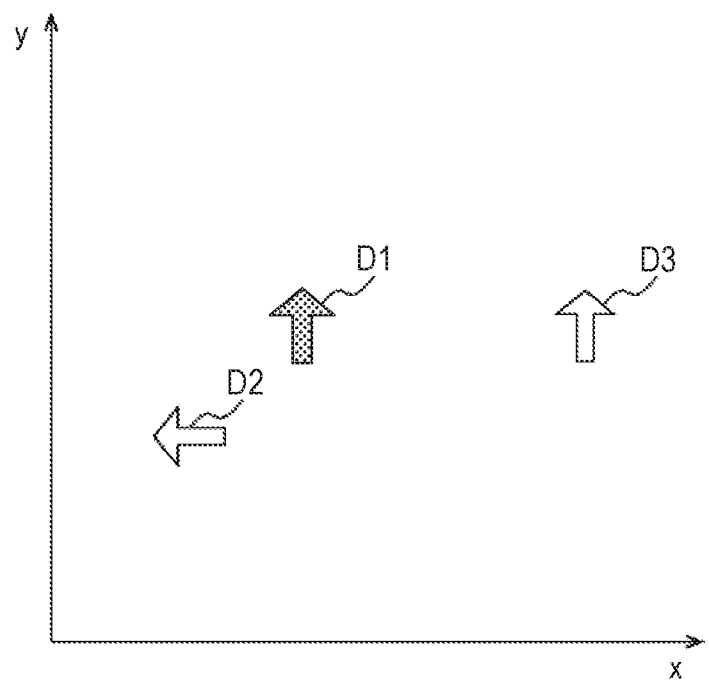
FIG. 9 is a schematic diagram illustrating the position and the orientation of a current image and a past image.

The present example embodiment provides a method for more accurately displaying a past image corresponding to the current captured range of the camera 115, that is, the user's field of view. The configuration of the image display system 100 according to the present example embodiment is the same as that of the first example embodiment, and the only difference is in a calculation method of a similarity degree. FIG. 9 is a schematic diagram illustrating positions and orientations of a current image and a past image. In FIG. 9, the positions and orientations of the current image and the past image are represented by arrows on an x-y plane with any point being the origin. The position of an arrow illustrates the position of the current image or the past image, the direction of an arrow illustrates the orientation of the current image or the past image. The positive direction in the y-axis is here defined as the north direction.

The orientation of the current image D1 is the north direction, the orientation of a first past image D2 is the west direction, and the orientation of a second past image D3 is the north direction. The distance between the position of the current image D1 and the position of the first past image D2 is shorter than the distance between the position of the current image D1 and the position of the second past image D3. The image display system 100 according to the present example embodiment determines that the second past image D3 is more similar to the current image D1 than the first past image D2 is. In other words, in calculation of a similarity degree according to the present example embodiment, closeness of the orientation is prioritized over closeness of the position.

Specifically, the similarity degree calculation unit 1501 sets the weighting factor $\alpha$ to be larger than 1 in Equation (1) described above to calculate the similarity degree S. The specific value of the weighting factor $\alpha$ may be determined by experiment or calculation. Thereby, the similarity degree S is calculated which is weighted such that the orientation shift (P0−P) has more influence on the resemblance than the position shift (Q0−Q). From Equation (1), a smaller shift (P0−P) between the current orientation and the orientation of a past image results in a smaller similarity degree S, that is, higher resemblance.

In acquiring the past images based on the current position and orientation, when the orientations are significantly different from each other, a common region is less likely to be included in captured images even when the position is close. In contrast, when the orientations are close, a common region is likely to be included in captured images even when the positions are distant from each other. Therefore, in the present example embodiment, it is possible to more accurately acquire a past image corresponding to the user's current field of view by performing weighting so as to prioritize the orientation over the position to calculate a similarity degree.

Third Example Embodiment

Figure 10:
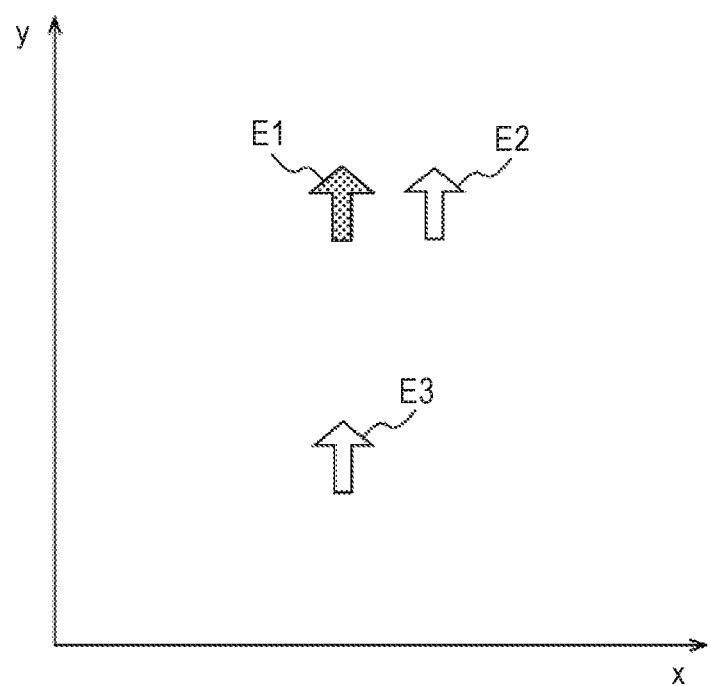
FIG. 10 is a schematic diagram illustrating the position and the orientation of a current image and a past image.

The present example embodiment provides a method for more accurately displaying a past image corresponding to a current captured range of the camera 115, that is, the user's field of view. The configuration of the image display system 100 according to the present example embodiment is the same as that of the first example embodiment, and the only difference is in a calculation method of a similarity degree. FIG. 10 is a schematic diagram illustrating positions and orientations of a current image and a past image. In FIG. 10, the positions and orientations of the current image and the past image are represented by arrows on an x-y plane with any point being the origin, respectively. The position of an arrow illustrates the position of the current image or the past image, the direction of an arrow illustrates the orientation of the current image or the past image. The positive direction in the y-axis is here defined as the north direction.

The orientation of all the current image E1, a first past image E2, and a second past image E3 is the north direction. The position of the first past image E2 is shifted in the positive direction in the x-axis from the position of the current image E1. The position of the second past image E3 is shifted in the negative direction in the y-axis from the position of the current image E1. The distance between the position of the current image E1 and the position of the first past image E2 is shorter than the distance between the position of the current image E1 and the position of the second past image E3. The image display system 100 according to the present example embodiment determines that the second past image E3 is more similar to the current image E1 than the first past image E2 is. In other words, in calculation of a similarity degree according to the present example embodiment, a shift in a direction parallel to the current orientation (y-axis direction of FIG. 10) is more tolerated than a shift in a direction perpendicular to the current orientation (x-axis direction of FIG. 10).

Specifically, the similarity degree S is calculated by the following Equation (2) expanded from Equation (1) described above. For simplicity here, the x-axis and the y-axis are defined such that the current orientation corresponds to the y-axis direction.

[Math. 2]

$$S=\alpha(P0-P)^2+[\beta(Q0_x-Q_x)^2+(Q0_y-Q_y)^2] \quad (2)$$

The value P0 denotes the current orientation, and the value P denotes the orientation of a past image. The value Q0x is the x-coordinate of the current position, and the value Qx is the x-coordinate of the position of the past image. The value Q0y is the y-coordinate of the current position, and the value Qy is the y-coordinate of the position of the past image. The value α is a weighting factor used for adjusting weighting of the orientation and the position, and the value β is a weighting factor used for adjusting weighting of the positions in the x-direction and the y-direction. The weighting factor β is a value greater than 1. The specific value of the weighting factor β may be determined by experiment or calculation.

According to Equation (2), the closer the position and orientation of a target past image to the current position and orientation of the mobile terminal 110 is, the lower the similarity degree S is. Furthermore, the similarity degree S is a value in which a position shift (Q0y−Qy) in a direction parallel to the current orientation (y-axis direction) is tolerated compared to a position shift (Q0x−Qx) in a direction perpendicular to the current orientation (x-axis direction). In other words, the similarity degree S is calculated which is weighted such that the position shift in a direction perpendicular to the current orientation has more influence on the resemblance than the position shift in a direction parallel to the current orientation. From Equation (2), a smaller position shift (Q0x−Qx) in a direction perpendicular to the current orientation results in a smaller similarity degree S, that is, higher resemblance.

In acquiring the past image based on the current position and orientation, when the positions of the current image and the past image are different in a direction perpendicular to the current orientation (x-axis direction of FIG. 10), a large shift occurs at the center of the current image and the past image. Thus, a region not common to the current image and the past image increases. In contrast, when the positions of the current image and the past image are different in a direction parallel to the current orientation (y-axis direction of FIG. 10), since the centers of the current image and the past image are close to each other, the region that is common between the current image and the past image is large. This allows for display of a past image close to the user's current field of view and comparison to a past image for many regions included in the current image.

Furthermore, it is more preferable to calculate a similarity degree so as to tolerate a rearward shift in a direction parallel to the current orientation (y-axis direction of FIG. 10). Specifically, the similarity degree S is calculated by using the following Equation (3) expanded from Equation (2) described above. For simplicity here, the x-axis and the y-axis are defined such that the current orientation is in the y-axis direction.

[Math. 3]

$$S=\alpha(P0-P)^2+\{\beta(Q0_x-Q_x)^2+[(Q0_y-\text{offset})-Q_y]^2\} \quad (3)$$

In addition to the same definition in Equation (2), the value "offset" is a constant value larger than 0. The constant value "offset" is a value indicating what is the most preferable degree by which the position of a past image is in rearward of the current position. That is, when the position of the past image is in rearward of the current position by the constant value "offset", the similarity degree S is the minimum. Thus, the similarity degree S is calculated so that the resemblance is higher in a case where the position of the past image is in rearward in a direction parallel to the current orientation from the current position than in a case where the position of the past image is located forward in a direction parallel to the current orientation from the current position.

In Equation (3), in particular, the similarity degree S is smaller when the position of a past image is in more rearward in a direction parallel to the current orientation (negative direction in the y-axis of FIG. 10) than the current position is. When the position of a past image is in rearward of the current position, more regions in the current image is included in a past image. This allows for display of a past image closer to the user's current field of view and comparison to a past image for more regions included in the current image.

Fourth Example Embodiment

Figure 11:
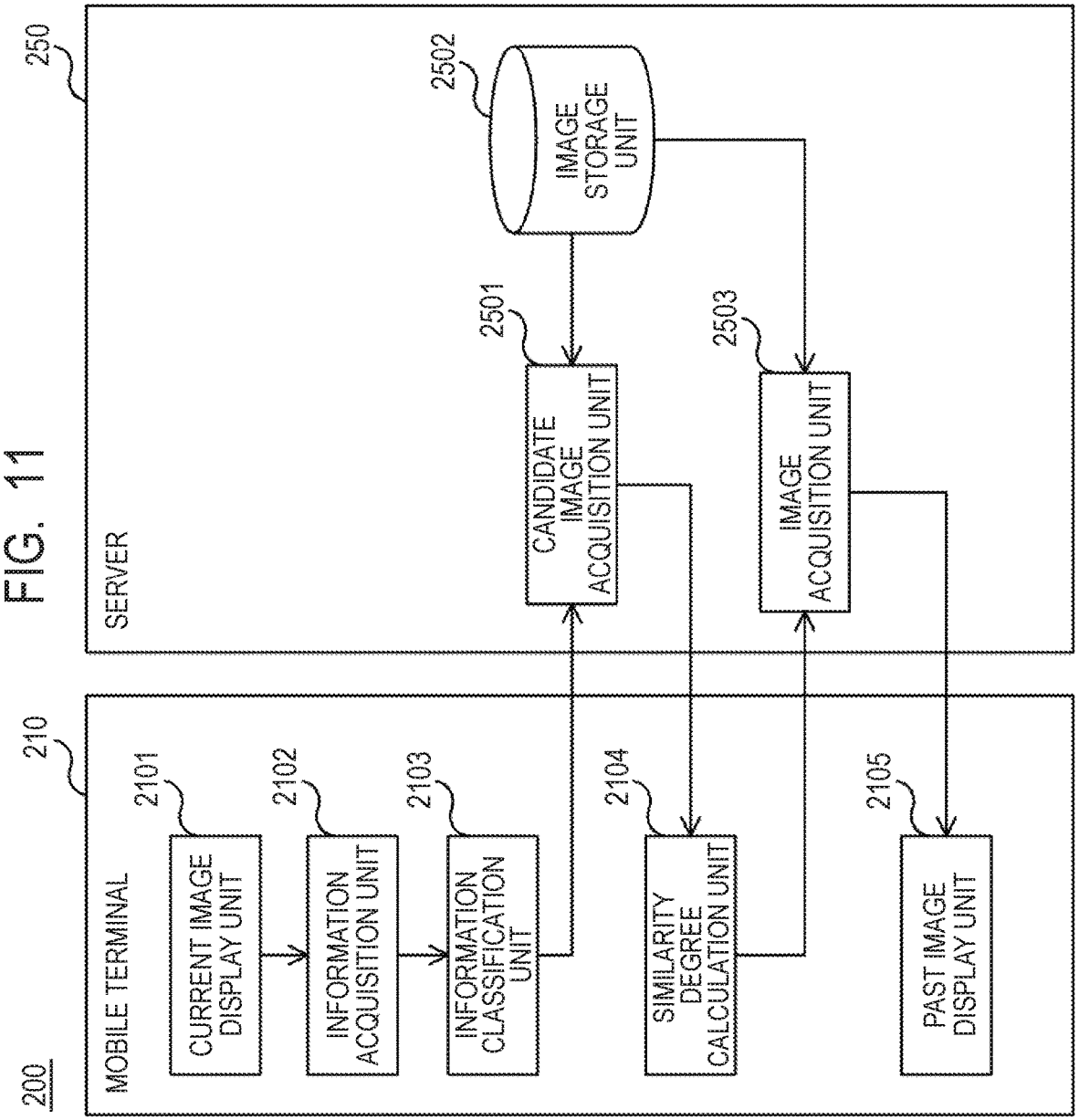
FIG. 11 is a block diagram of an image display system according to a fourth example embodiment.

The present example embodiment displays a past image by a method different from that in the first example embodiment. FIG. 11 is a block diagram of an image display system 200 according to the present example embodiment. In FIG. 11, arrows represent main dataflows, and there may be other dataflows than those illustrated in FIG. 11. In FIG. 11, each block illustrates a configuration in a unit of function rather than in a unit of hardware (device). The image display system 200 has the same device configuration as that of the first example embodiment. That is, a mobile terminal 210 has the same device configuration as the mobile terminal 110 of FIG. 2, and a server 250 has the same device configuration as the server 150 of FIG. 2.

The mobile terminal 210 has a current image display unit 2101, an information acquisition unit 2102, an information classification unit 210, a similarity degree calculation unit 2104, and a past image display unit 2105. In the mobile terminal 2103, the current image display unit 2101, the information acquisition unit 2102, the information classification unit 2013, the similarity degree calculation unit 2014, and the past image display unit 2105 are stored in the memory 112 as programs that can be executed by the processor 111, respectively. That is, when performing the image display method according to the present example embodiment, the processor 111 functions as the current image display unit 2101, the information acquisition unit 2102, the information classification unit 2013, the similarity degree calculation unit 2014, and the past image display unit 2105. At least a part of these functions may be implemented as an electric circuit instead of a program.

The server 250 has a candidate image acquisition unit 2501, an image storage unit 2502, and an image acquisition unit 2503. In the server 250, the candidate image acquisition unit 2501 and the image acquisition unit 2503 are stored in the memory 152 or the storage device 153 as programs that can be executed by the processor 151. Further, the image storage unit 2502 is a part of the memory 152 or the storage device 153. That is, when performing the image display method according to the present example embodiment, the processor 151 functions as the candidate image acquisition unit 2501 and the image acquisition unit 2503, and the memory 152 or the storage device 153 functions as the image storage unit 2502. At least a part of these functions may be implemented as an electric circuit instead of a program.

The current image display unit 2101 displays the content currently captured by the camera 115 as a current image on the display 113. The current image display unit 2101 updates the current image being displayed every predetermined time (for example, every ⅟30 seconds).

The information acquisition unit 2102 acquires the current position of the mobile terminal 210 by using the GPS receiver 117 and the current orientation of the mobile terminal 210 by using the electric compass 116 in response to detection of a predetermined user operation (for example, pressing of the button B5 of FIG. 4). The definitions of a position and an orientation are the same as those in the first example embodiment.

Figure 12:
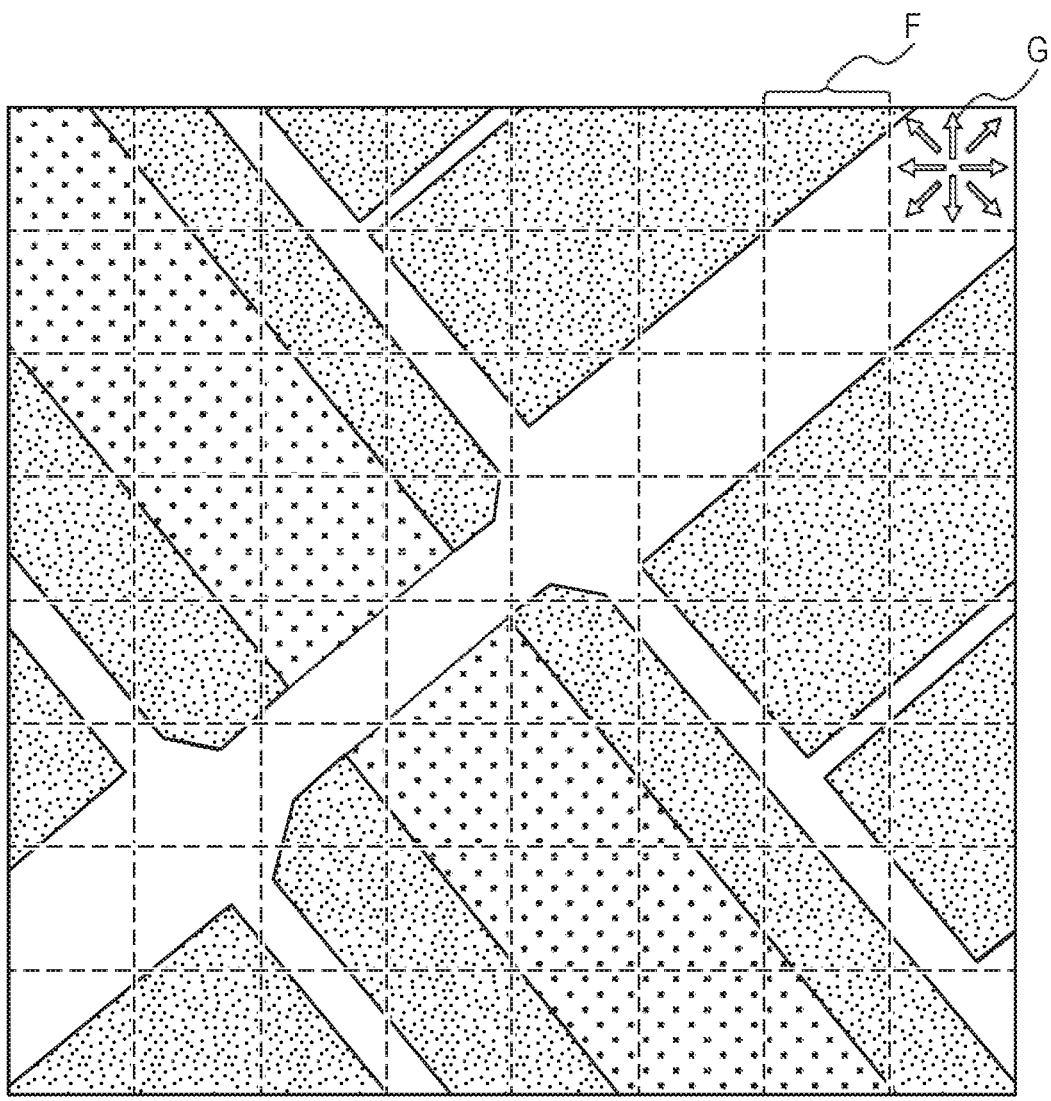
FIG. 12 is a schematic diagram illustrating a classification reference of the position and the orientation.

The information classification unit 2103 classifies the current position and orientation acquired by the information acquisition unit 2102 every predetermined time (for example, every ⅟30 seconds) based on a predetermined classification criterion. FIG. 12 is a schematic diagram illustrating a classification criterion of positions and orientations. The classification of positions and orientations is represented by combinations of a cell F and an in-cell azimuth G. Each of the cells F is a rectangular region of a plan map divided by predetermined length in the vertical and horizontal directions, respectively. The in-cell azimuths G are eight directions divided each by 45 degrees of a whole azimuth angle of 360 degrees.

The information classification unit 2103 determines which of the cells F the current position is included and which of the in-cell azimuths G the current orientation is the closest to. Which of the cells F the current position is included is determined by whether or not coordinates indicating the current position are included in a cell F. When the current position is on a boundary of a plurality of cells F, it may be determined that the current position is included in one of the cells F selected from the plurality of cells F.

When the classification of the current position and orientation determined at this time changes from the classification of the current position and orientation determined at the previous time, the information classification unit 2103 uses the mobile communication device 118 to transmit the classification of the current position and orientation to the server 250. In other words, only at the timing of a change in the classification of the current position and orientation, the mobile terminal 210 transmits the classification of the current position and orientation to the server 250. This can reduce the frequency of transmission and reception of the information of the position and orientation and thus can reduce the traffic.

The classification criteria of the position and the orientation illustrated here are an example. As the in-cell azimuths G, any number of azimuths may be used without being limited to the eight directions. In order to appropriately select a past image corresponding to the user's field of view, it is desirable to use at least four directions obtained by dividing the whole azimuth angles of 360 degrees by 90 degrees each as an in-cell azimuth G. As the cell F, without being limited to the rectangular region divided by the length in the vertical and horizontal direction, a region with other shapes or a region divided into addresses such as street numbers may be used.

The image storage unit 2502 pre-stores past images, the positions and orientations of captured ranges of the past images, and the classification of the position and the orientation. The classification criteria of positions and orientations of the past images in the server 250 are the same as the classification criteria of the current position and orientation in the mobile terminal 210. That is, the classification criteria are unified in advance between the server 250 and the mobile terminal 210. The image storage unit 2502 stores past images as image files that are electronic data. Each past image is provided with a unique identifier (for example, a file name). The image storage unit 2502 classifies the positions and the orientations of the past images using combinations of the cell F and the in-cell azimuth G based on the classification criteria described above. The image storage unit 2502 then stores the positions and the orientations of the past images and the classification thereof (that is, combinations of the cell F and the in-cell azimuth G) as a table of a database, for example, in association with the identifiers of the past images.

The candidate image acquisition unit 2501 determines, as a candidate image(s) from the image storage unit 2502, one or a plurality of past images belonging to the same classification as the classification of the current position and orientation received from the mobile terminal 210. Then, the candidate image acquisition unit 2501 uses the communication interface to transmit the identifier, the position, and the orientation of the determined candidate image to the mobile terminal 210. The identifier, the position, and the orientation of the candidate image are sequentially transmitted to the mobile terminal 210 in response to reception of the classification of the current position and orientation from the mobile terminal 210 (that is, at a timing when the classification of the current position and orientation changes).

Since the position acquired from the GPS has an error, when the current position or the position of a past image are near a boundary of the cells F, it may be erroneously classified into a cell F different from the actual position. Further, when the current position is near a boundary of the cells F, a past image within the neighboring cell F may be similar to the current captured range than a past image within the cell F may be. In order to solve this, as a first method, an overlap portion may be provided between neighboring cells F, and the candidate image acquisition unit 2501 may acquire, as a candidate image, a past image belonging to the range of the cell F pulse the overlapping portion. In this case, a single past image may be classified into a plurality of cells F. As a second method, the candidate image acquisition unit 2501 may acquire, as a candidate image, a past image belonging to the neighboring cell F in addition the cell F belonging to the current position (that is, four cells F located in the above, below, left, and right, or eight cells F located in the above, below, left, right, and oblique). According to these methods, since the current position and direction can be compared with the position and direction of past images located not only in a cell F but also in the surrounding cells F, a past image more similar to the current position and direction can be acquired.

In response to detection of a predetermined user operation (for example, pressing of the button B5 of FIG. 4), the similarity degree calculation unit 2104 uses the current position and orientation acquired by the information acquisition unit 2102 to calculate the resemblance for the position and orientation of the candidate image received from the server 250 based on a predetermined calculation criterion. As a calculation method of the similarity degree by the similarity degree calculation unit 2104, any of Equations (1) to (3) described above may be used. The similarity degree calculation unit 2104 selects a past image having the smallest similarity degree S or a predetermined number of past images in ascending order of the similarity degree S out of the candidate images. The similarity degree calculation unit 2104 then uses the mobile communication device 118 to transmit the identifier of the selected past image to the server 250.

The image acquisition unit 2503 acquires, from the image storage unit 2502, a past image having the identifier received from the mobile terminal 210. The image acquisition unit 2503 then uses the communication interface to transmit the acquired past image to the mobile terminals 210.

The past image display unit 2105 displays the past image received from the server 250 on the display 113. When a plurality of past images are received from the server 250, the past image display unit 2105 may display one of the past images (for example, having the smallest similarity degree S) and switch it to another past image for display in response to a user operation. Further, the past image display unit 2105 may display one of the plurality of past images (for example, having the smallest similarity degree S) as a larger image and display the rest as smaller images.

As another method, the candidate image acquisition unit 2501 may transmit the candidate image itself to the mobile terminal 210 instead of the identifier of the candidate image. In this case, the similarity degree calculation unit 2104 and the image acquisition unit 2503 may be omitted. The past image display unit 2105 may display one of the plurality of candidate images (for example, having the capturing time closest to the current) and switch it to another candidate image for display in response to the user operation. Further, the past image display unit 2105 may display one of the plurality of past images (for example, having the capturing time closest to the current) as a larger image and display the rest as smaller images.

Figure 13:
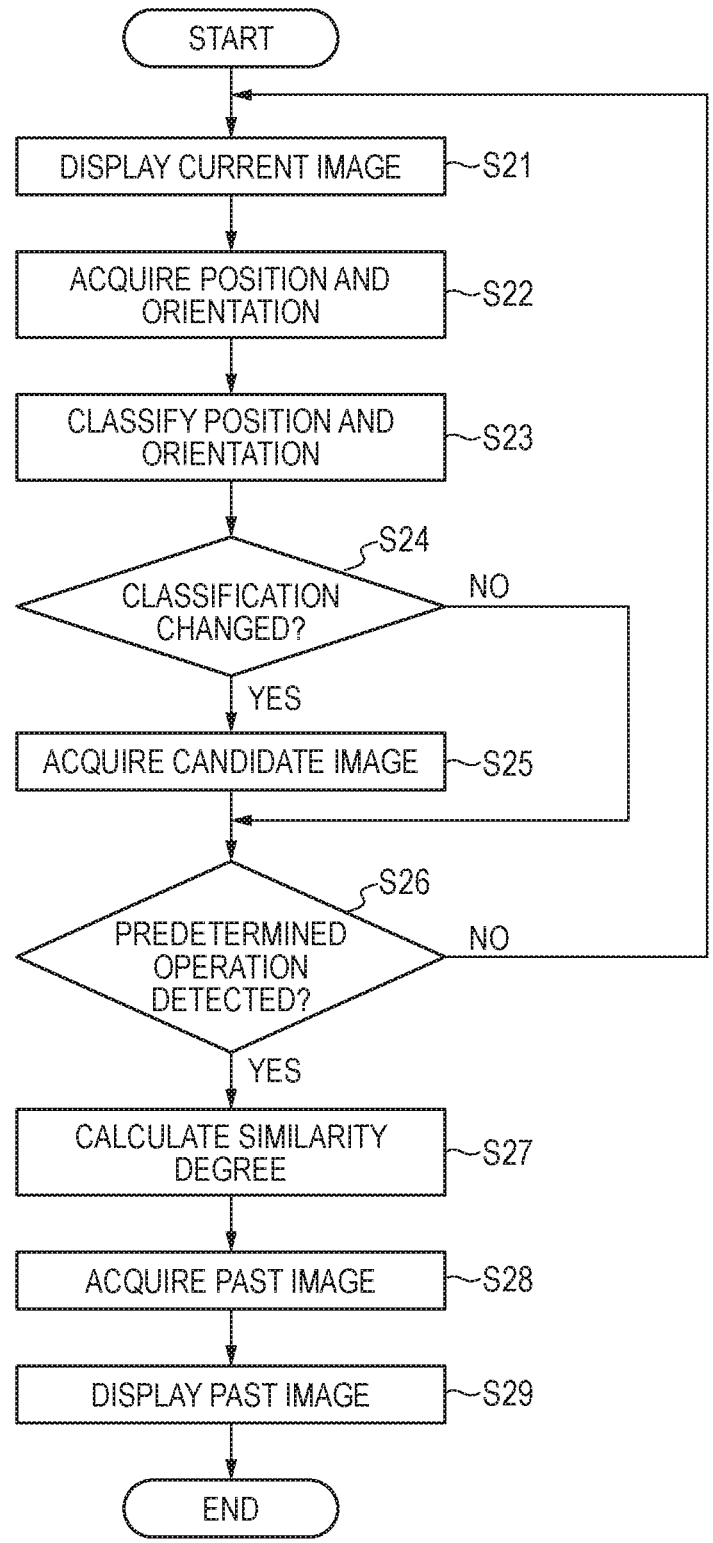
FIG. 13 is a diagram illustrating a flowchart of an image display method according to the fourth example embodiment.
Figure 14:
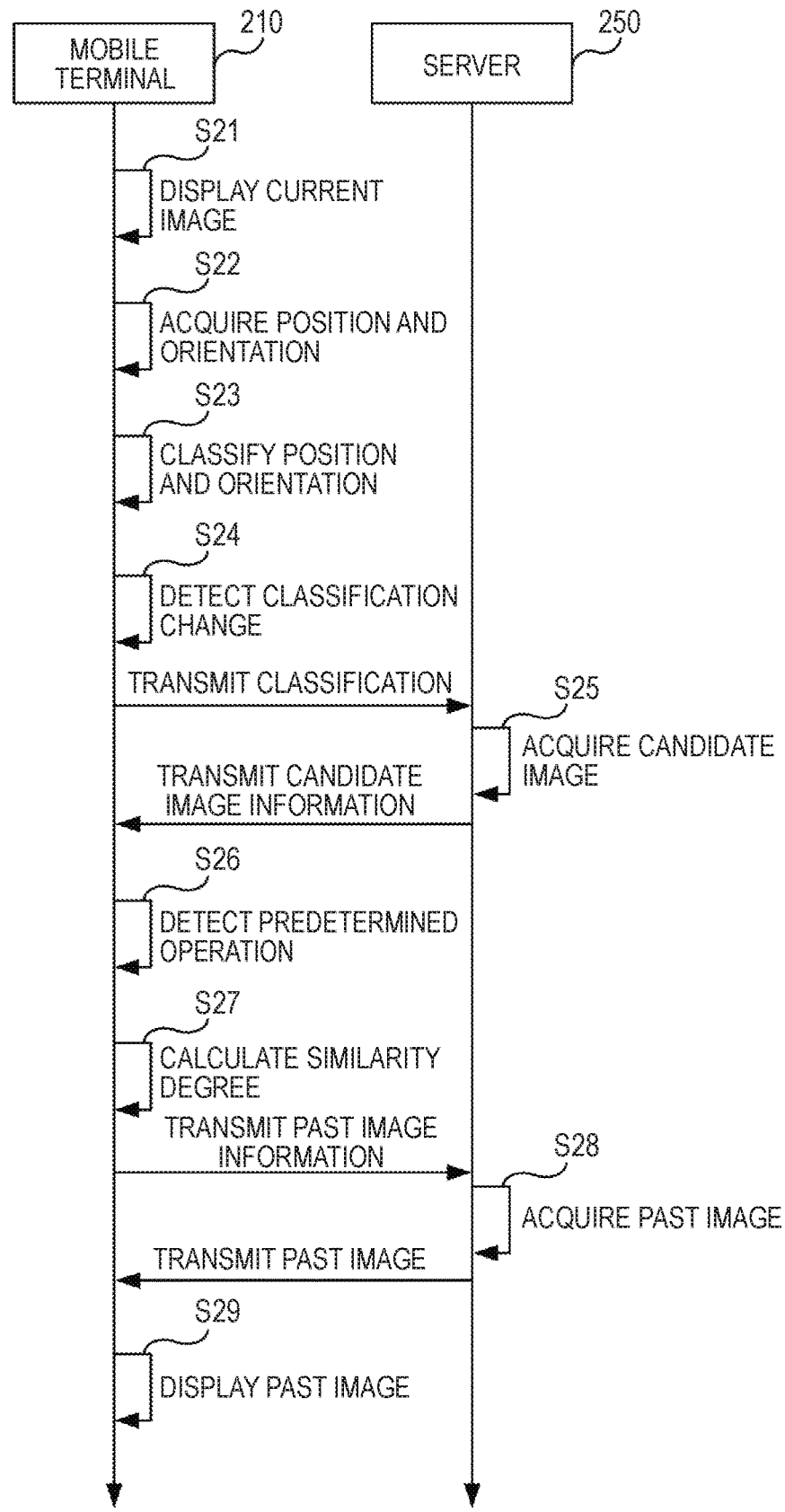
FIG. 14 is a diagram illustrating a sequence of the image display method according to the fourth example embodiment.

FIG. 13 is a diagram illustrating a flowchart of the image display method according to the present example embodiment. FIG. 14 is a sequence diagram of the image display method according to the present example embodiment. The image display method is performed in corporation with the mobile terminal 210 and the server 250. The image display method is started when a predetermined operation such as pressing of a button for displaying the current image is detected on the mobile terminal 210, for example.

First, the current image display unit 2101 displays the content currently captured by the camera 115 as a current image on the display 113 (step S21). The information acquisition unit 2102 acquires the current position of the mobile terminal 210 by using the GPS receiver 117 and acquires the current orientation of the mobile terminal 210 by using the electronic compass 116 (step S22). The information classification unit 2103 classifies the current position and orientation acquired in step S22 based on the classification criteria described above (step S23). Step S21 and steps S22 to S23 may be performed in parallel.

If the classification of the position and the orientation acquired in step S23 is different from the classification of the position and the orientation acquired in the previous time (or if this flowchart is first performed) (step S24, YES), the information classification unit 2103 uses the mobile communication device 118 to transmit the classification of the position and the orientation acquired in step S23 to the server 250. The candidate image acquisition unit 2501 then determines, as a candidate image from the image storage unit 2502, one or a plurality of past images belonging to the same classification as the classification of the current position and orientation received from the mobile terminal 210 (step S25). The candidate image acquisition unit 2501 uses the communication interface to transmit information on the candidate image including the identifier, the position, and the orientation of the determined candidate image to the mobile terminal 210. On the other hand, If the classification of the position and the orientation acquired in step S23 is the same as the classification of the position and the orientation acquired in the previous time (step S24, NO), the information classification unit 2103 does not perform transmission of the classification of the position and the orientation and skips step S25.

Then, if a predetermined operation such as pressing of a button for displaying the past image is not detected on the mobile terminal 210 (step S26, NO), the mobile terminal 210 repeats steps S21 to S25 every predetermined time.

If a predetermined operation such as pressing of a button for displaying the past image is detected on the mobile terminal 210 (step S26, YES), the similarity degree calculation unit 2104 uses the current position and orientation acquired in step S22 and the position and orientation of the candidate image received from the server 250 to calculate the similarity degree S for each candidate image based on any of Equation (1) to Equation (3) described above, for example (step S27). The similarity degree calculation unit 2104 selects a candidate image having the smallest similarity degree S or a predetermined number of candidate images in ascending order of the similarity degree S as a past image to be displayed out of the candidate images. The similarity degree calculation unit 2104 then uses the mobile communication device 118 to transmit, to the server 250, the identifier of the past image to be displayed.

The image acquisition unit 2503 acquires, from the image storage unit 2502, a past image having the identifier received from the mobile terminal 210 (step S28). The image acquisition unit 2503 uses the communication interface to transmit the acquired past image to the mobile terminals 210.

The past image display unit 2105 displays one or a plurality of past images received from the server 250 on the display 113 (step S29).

The processor 111 of the mobile terminal 210 and the processor 151 of the server 150 are subjects of each step (process) included in the image display method illustrated in FIG. 13. That is, the processor 111 and the processor 151 read the program for executing the image display method illustrated in FIG. 13 from the memory 112, the memory 152, or the storage device 153, execute the program to control respective units of the mobile terminal 210 and the server 250, and thereby perform the image display method illustrated in FIG. 13.

According to the image display system 200 of the present example embodiment, since the information of the position and the orientation is transmitted and received at only the timing when the timing of the position and orientation changes, the traffic can be reduced, in addition that the same advantages as those in the first example embodiment can be obtained. Furthermore, since the similarity degree S to be calculated is limited to past images belonging to the same classification, the amount of calculation can be reduced.

Fifth Example Embodiment

The image display system 100 according to the first example embodiment may be configured to learn conditions of the content or the position and orientation of the current image and the past image.

In the present example embodiment, in the configuration of FIG. 6, at every time the user performs an operation for displaying a past image (that is, every time the position and the orientation are received from the information acquisition unit 1102), the image acquisition unit 1503 stores the position and the orientation at the time in the memory 152 or the storage device 153.

The image acquisition unit 1503 projects, from the position and the orientation obtained when an operation for displaying the past image was performed in the past, the position and the orientation obtained when an operation for displaying a past image is next performed, acquires in advance one or a plurality of past images based on the projected position and orientation, and reads them on the memory 152. That is, the image acquisition unit 1503 pre-loads, on the memory 152, a past image which is highly likely to be read next.

The image acquisition unit 1503 may create a projection model by using the position and the orientation obtained when the operation of displaying a past image was performed based on a known leaning method. The image acquisition unit 1503 then selects a past image which is highly likely to be read next from the created prediction model. For example, when it has been learned that past images are read for a plurality of orientations for a single position and when an operation of displaying a past image with particular position and orientation is performed, past images of the same position and different orientations are read in advance on the memory 152. When it has been learned that past images are read for a plurality of positions for a single orientation has been learned and when an operation of displaying a past image with particular position and orientation is performed, past images of the same orientation and a close position are read in advance on the memory 152. Thereby, when an operation of displaying a past image is next performed and when the current position and orientation and the projected position and orientation are the same as or similar to each other, a past image early read on the memory 152 can be quickly presented on the mobile terminal 110.

As another method, learning may be made based on the content of images, that is, an object included in images. In this case, the image acquisition unit 1503 extracts an object from the past image based on a known object recognition method and stores a particular object frequently appears therein (for example, a trash box) in the memory 152 or the storage device 153. When an operation of displaying a past image is performed, the image acquisition unit 1503 applies a known object recognition method also to the current image to extract the object. Then, when the above-described particular object is included in the current image, the image acquisition unit 1503 acquires one or a plurality of past images included in the particular object (in particular, close to the current position and orientation) from the image storage unit 1502 and transmits it to the mobile terminal 110. It is therefore possible to focus on a particular object to mainly display a suspicious part and easily find a suspicious object.

According to the present example embodiment, it is possible to more quickly and appropriately display a past image by performing learning and projection based on at least one of the content and the position and orientation of a current image and a past image, in addition to obtain the same advantages as those in the first example embodiment.

Other Example Embodiments

Figure 15:
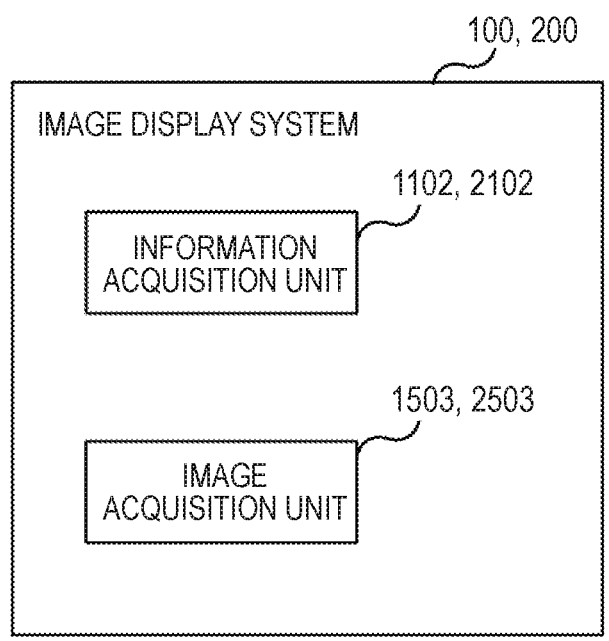
FIG. 15 is a general configuration diagram of an image display system according to each example embodiment.

FIG. 15 is a schematic diagram of the image display systems 100 and 200 according to respective example embodiments described above. FIG. 15 illustrates a configuration example for the image display systems 100 and 200 to implement the function of displaying an image stored in the past based on the position and the orientation of a mobile terminal. The image display systems 100 and 200 have the information acquisition units 1102 and 2102 that acquire information including a position and an orientation of a mobile terminal and the image acquisition unit 1503 and 2503 that, based on the position and the orientation of the mobile terminal and a position and an orientation associated with an image stored in a storage device in the past, acquire the image.

The present invention is not limited to the example embodiments described above and can be properly changed within a scope not departing from the spirit of the present invention.

Further, the scope of each of the example embodiments includes a processing method that stores, in a storage medium, a program causing the configuration of each of the example embodiments to operate so as to realize the function of each of the example embodiments described above (more specifically, a program causing a computer to perform the method illustrated in FIG. 7 or FIG. 13), reads the program stored in the storage medium as a code, and executes the program in a computer. That is, the scope of each of the example embodiments also includes a computer readable storage medium. Further, each of the example embodiments includes not only the storage medium in which the program described above is stored but also the program itself.

As the storage medium, for example, a floppy (registered trademark) disk, a hard disk, an optical disk, a magneto-optical disk, a CD-ROM, a magnetic tape, a nonvolatile memory card, or a ROM can be used. Further, the scope of each of the example embodiments includes an example that operates on OS to perform a process in cooperation with another software or a function of an add-in board without being limited to an example that performs a process by an individual program stored in the storage medium.

The whole or part of the example embodiments disclosed above can be described as, but not limited to, the following supplementary notes.

(Supplementary Note 1)

An image display system comprising:

an information acquisition unit that acquires information including a position and an orientation of a mobile terminal; and an image acquisition unit that, based on the position and the orientation of the mobile terminal and a position and an orientation associated with an image stored in a storage device in the past, acquires the image.

(Supplementary Note 2)

The image display system according to supplementary note 1, wherein the position and the orientation associated with the image are a position and an orientation in a captured range of the image.

(Supplementary Note 3)

The image display system according to supplementary note 1 or 2 further comprising a similarity degree calculation unit that calculates a similarity degree indicating resemblance between the position and the orientation of the mobile terminal and the position and the orientation associated with the image, wherein the image acquisition unit acquires the image based on the similarity degree.

(Supplementary Note 4)

The image display system according to supplementary note 3, wherein the similarity degree calculation unit calculates the similarity degree so that, between the mobile terminal and the image, a shift of the orientation has more influence on the resemblance than a shift of the position and a smaller shift of the orientation results in higher resemblance.

(Supplementary Note 5)

The image display system according to supplementary note 3 or 4, wherein the similarity degree calculation unit calculates the similarity degree so that, between the mobile terminal and the image, a shift of the position in a direction perpendicular to the orientation has more influence on the resemblance than a shift of the position in a direction parallel to the orientation and a smaller shift of the position in the direction perpendicular to the orientation results in higher resemblance.

(Supplementary Note 6)

The image display system according to supplementary note 5, wherein the similarity degree calculation unit calculates the similarity degree so that the resemblance is higher when the position associated with the image is in rearward in a direction parallel to the orientation of the mobile terminal from the position associated with the mobile terminal than when the position associated with the image is in forward in a direction parallel to the orientation of the mobile terminal from the position of the mobile terminal.

(Supplementary Note 7)

The image display system according to any one of supplementary notes 1 to 6 comprising:

the mobile terminal having the information acquisition unit; and a server having the image acquisition unit.

(Supplementary Note 8)

The image display system according to any one of supplementary notes 1 to 6 further comprising an information classification unit that classifies the position and the orientation of the mobile terminal into a classification on a predetermined area basis and on a predetermined azimuth basis, wherein the image acquisition unit acquires the image based on the classification.

(Supplementary Note 9)

The image display system according to supplementary note 8 comprising:

the mobile terminal having the information acquisition unit; and a server having the image acquisition unit, wherein, when the classification changes, the information classification unit transmits the classification from the mobile terminal to the server.

(Supplementary Note 10)

The image display system according to any one of supplementary notes 1 to 9, wherein the image acquisition unit performs learning based on at least one of content of the image acquired in the past and the position and the orientation associated with the image.

(Supplementary Note 11)

A terminal comprising:

an information acquisition unit that acquires information including a position and an orientation; and an image display unit that, based on the position and the orientation and a position and an orientation associated with an image stored in a storage device in the past, displays the image.

(Supplementary Note 12)

A method comprising:

acquiring information including a position and an orientation of a mobile terminal; and based on the position and the orientation of the mobile terminal and a position and an orientation associated with an image stored in a storage device in the past, acquiring the image.

(Supplementary Note 13)

A program that causes a computer to perform:

acquiring information including a position and an orientation of a mobile terminal; and based on the position and the orientation of the mobile terminal and a position and an orientation associated with an image stored in a storage device in the past, acquiring the image.

This application is based upon and claims the benefit of priority from Japanese Patent Application No. 2016-035650, filed on Feb. 26, 2016, the disclosure of which is incorporated herein in its entirety by reference.

The invention claimed is:

1. An image display system comprising:

at least one memory configured to store instructions; and at least one processor configured to execute the instructions to:

acquire information including a position and an orientation of a mobile terminal; and compare the position and the orientation of the mobile terminal directly with a position and an orientation associated with an image stored in a storage device in the past to acquire the image based on a comparison result of comparing the position and the orientation of the mobile terminal with the position and the orientation associated with an image;

calculate a similarity degree indicating resemblance between the position and the orientation of the mobile terminal and the position and the orientation associated with the image;

acquire the image based on the similarity degree; and calculate the similarity degree so that, between the mobile terminal and the image, a shift of the orientation has more influence on the resemblance than a shift of the position and a smaller shift of the orientation results in higher resemblance.

2. The image display system according to claim 1, wherein the position and the orientation associated with the image are a position and an orientation in a captured range of the image.

3. The image display system according to claim 1, wherein the at least one processor is further configured to execute the instructions to:

calculate the similarity degree so that, between the mobile terminal and the image, a shift of the position in a direction perpendicular to the orientation has more influence on the resemblance than a shift of the position in a direction parallel to the orientation and a smaller shift of the position in the direction perpendicular to the orientation results in higher resemblance.

4. The image display system according to claim 3, wherein the at least one processor is further configured to execute the instructions to:

calculate the similarity degree so that the resemblance is higher when the position associated with the image is in rearward in a direction parallel to the orientation of the mobile terminal from the position associated with the mobile terminal than when the position associated with the image is in forward in a direction parallel to the orientation of the mobile terminal from the position of the mobile terminal.

5. The image display system according to claim 1 comprising:

the mobile terminal having a processor that is configured to acquire the information; and a server that has a processor configured to acquire the image.

6. The image display system according to claim 1 wherein the at least one processor is further configured to execute the instructions to:

classify the position and the orientation of the mobile terminal into a classification on a predetermined area basis and on a predetermined azimuth basis, and acquire the image based on the classification.

7. The image display system according to claim 6 comprising:

the mobile terminal having a processor that is configured to acquire the information; and a server that has a processor that is configured to acquire the image, wherein, when the classification changes, the at least one processor is further configured to transmits the classification from the mobile terminal to the server.

8. The image display system according to claim 1, wherein the at least one processor is further configured to perform learning based on at least one of content of the image acquired in the past and the position and the orientation associated with the image.

9. A terminal comprising:

at least one memory configured to store instructions; and at least one processor configured to execute the instructions to:

acquire information including a position and an orientation;

compare the position and the orientation directly with a position and an orientation associated with an image stored in a storage device in the past to display the image based on a comparison result of comparing the position and the orientation with the position and the orientation associated with an image;

calculate a similarity degree indicating resemblance between the position and the orientation of the mobile terminal and the position and the orientation associated with the image;

acquire the image based on the similarity degree; and calculate the similarity degree so that, between the mobile terminal and the image, a shift of the orientation has more influence on the resemblance than a shift of the position and a smaller shift of the orientation results in higher resemblance.

10. A method comprising:

acquiring information including a position and an orientation of a mobile terminal;

comparing the position and the orientation of the mobile terminal directly with a position and an orientation associated with an image stored in a storage device in the past to acquire the image based on a comparison result of comparing the position and the orientation of the mobile terminal with the position and the orientation associated with an image;

calculating a similarity degree indicating resemblance between the position and the orientation of the mobile terminal and the position and the orientation associated with the image;

acquiring the image based on the similarity degree; and calculating the similarity degree so that, between the mobile terminal and the image, a shift of the orientation has more influence on the resemblance than a shift of the position and a smaller shift of the orientation results in higher resemblance.

11. A non-transitory storage medium in which a program is stored, the program causing a computer to perform:

acquiring information including a position and an orientation of a mobile terminal;

comparing the position and the orientation of the mobile terminal directly with a position and an orientation associated with an image stored in a storage device in the past to acquire the image based on a comparison result of comparing the position and the orientation of the mobile terminal with the position and the orientation associated with an image;

calculating a similarity degree indicating resemblance between the position and the orientation of the mobile terminal and the position and the orientation associated with the image;

acquiring the image based on the similarity degree; and calculating the similarity degree so that, between the mobile terminal and the image, a shift of the orientation has more influence on the resemblance than a shift of the position and a smaller shift of the orientation results in higher resemblance.

12. An image display system comprising:

at least one memory configured to store instructions, an image captured in the past, and a position and an orientation where the image captured in; and at least one processor configured to execute the instructions to:

acquire information including a position and an orientation of a mobile terminal;

compare the position and the orientation of the mobile terminal with the position and the orientation stored in the memory;

determine the image to output, based on a comparison result of comparing the position and the orientation of the mobile terminal with the position and the orientation stored in the memory;

calculate a similarity degree indicating resemblance between the position and the orientation of the mobile terminal and the position and the orientation associated with the image;

acquire the image based on the similarity degree; and calculate the similarity degree so that, between the mobile terminal and the image, a shift of the orientation has more influence on the resemblance than a shift of the position and a smaller shift of the orientation results in higher resemblance.

* * * * *